US007742837B2

(12) United States Patent
Hair, III et al.

(10) Patent No.: US 7,742,837 B2
(45) Date of Patent: Jun. 22, 2010

(54) OPTICAL VEND-SENSING SYSTEM FOR CONTROL OF VENDING MACHINE

(75) Inventors: James M. Hair, III, Cheyenne, WY (US); Kyriakos P. Spentzos, Santa Rosa, CA (US)

(73) Assignee: Automated Merchandising Systems Inc., Kearneysville, WV (US)

( * ) Notice: Subject to any disclaimer, the term of this patent is extended or adjusted under 35 U.S.C. 154(b) by 0 days.

(21) Appl. No.: 12/010,126

(22) Filed: Jan. 22, 2008

(65) Prior Publication Data

US 2008/0121648 A1 May 29, 2008

Related U.S. Application Data

(63) Continuation of application No. 11/639,231, filed on Dec. 15, 2006, now Pat. No. 7,343,220, which is a continuation of application No. 10/838,222, filed on May 5, 2004, now Pat. No. 7,191,915, which is a continuation of application No. 09/729,853, filed on Dec. 6, 2000, now Pat. No. 6,794,634, which is a continuation of application No. 09/261,221, filed on Mar. 3, 1999, now Pat. No. 6,384,402.

(60) Provisional application No. 60/083,522, filed on Apr. 29, 1998.

(51) Int. Cl.
*G06F 17/00* (2006.01)

(52) U.S. Cl. ............................... 700/236; 221/2; 221/7; 221/13

(58) Field of Classification Search ..................... 221/2, 221/7, 13; 700/236
See application file for complete search history.

(56) References Cited

U.S. PATENT DOCUMENTS 645,499 A 3/1900 Vogel (Continued)

FOREIGN PATENT DOCUMENTS

DE 200 06 317 U1 11/2000

(Continued)

OTHER PUBLICATIONS

Automatic Products International, Ltd. & Gross-Given Manufacturing Co.'s Second Set of Supplemental Responses to Plaintiff's First Set of Interrogatories Nos. 1 10, including contentions and disclosure relating to a Declaration of Paul Mason and attached photos and sketch (7 pages).

(Continued)

*Primary Examiner*—Gene Crawford
*Assistant Examiner*—Timothy R Waggoner
(74) *Attorney, Agent, or Firm*—Davidson Berquist Jackson & Gowdey LLP

(57) ABSTRACT

For ensuring that a vending machine motor will continue to operate until a product has descended through a vending space or an established time interval has elapsed, an optical beam is established across the vend space through which a product must drop. A change in beam intensity is detected. By preference infra red light is emitted at one focal point of an elliptical reflector, and detected at the other focal point. The light is emitted in pulses in the preferred embodiment, and the optical sensing system has automated calibration and error detecting functions.

17 Claims, 16 Drawing Sheets

U.S. PATENT DOCUMENTS

| | | | | |
|---|---|---|---|---|
| 1,848,874 | A | | 3/1932 | Fitz Gerald |
| 2,571,283 | A | | 10/1951 | Nicholson |
| 2,590,736 | A | | 3/1952 | Tandler et al. |
| 2,900,521 | A | | 8/1959 | Eames |
| 3,025,406 | A | | 3/1962 | Stewart et al. |
| 3,041,462 | A | | 6/1962 | Ogle |
| 3,085,711 | A | | 4/1963 | Holstein et al. |
| 3,178,055 | A | | 4/1965 | Schuller |
| 3,235,738 | A | | 2/1966 | Kress et al. |
| 3,344,953 | A | | 10/1967 | Merrill et al. |
| 3,461,922 | A | | 8/1969 | Niehaus et al. |
| 3,537,091 | A | | 10/1970 | Schenkenberg |
| 3,572,978 | A | | 3/1971 | Scheldorf |
| 3,687,255 | A | | 8/1972 | Johnson, II |
| 3,704,396 | A | | 11/1972 | Macdonald |
| 3,723,737 | A | | 3/1973 | Zeldman et al. |
| 3,742,222 | A | | 6/1973 | Endl |
| 3,746,863 | A | | 7/1973 | Pronovost |
| 3,752,978 | A | | 8/1973 | Kahl, Jr. |
| 3,795,343 | A | | 3/1974 | Shigemori et al. |
| 3,805,061 | A | * | 4/1974 | De Missimy et al. ..... 250/208.3 |
| 3,828,903 | A | | 8/1974 | Levasseur |
| 3,889,118 | A | | 6/1975 | Walker |
| 3,894,220 | A | | 7/1975 | Levasseur |
| 3,901,366 | A | | 8/1975 | Schuller et al. |
| 3,914,579 | A | | 10/1975 | Shigemori et al. |
| 3,963,035 | A | | 6/1976 | Levasseur |
| 3,967,111 | A | | 6/1976 | Brown |
| 3,993,215 | A | | 11/1976 | Cox et al. |
| 4,008,792 | A | | 2/1977 | Levasseur et al. |
| 4,032,039 | A | | 6/1977 | Schuller |
| 4,033,442 | A | | 7/1977 | Wirstlin et al. |
| 4,033,477 | A | | 7/1977 | Hoppe et al. |
| 4,044,877 | A | | 8/1977 | Burton |
| 4,061,245 | A | | 12/1977 | Lotspeich |
| 4,108,333 | A | | 8/1978 | Falk et al. |
| 4,127,771 | A | | 11/1978 | Sick |
| 4,174,742 | A | | 11/1979 | Murphey |
| 4,231,105 | A | | 10/1980 | Schuller et al. |
| 4,252,250 | A | * | 2/1981 | Toth ............................ 221/13 |
| 4,260,882 | A | | 4/1981 | Barnes |
| 4,266,124 | A | | 5/1981 | Weber et al. |
| 4,310,756 | A | | 1/1982 | Sick et al. |
| 4,359,147 | A | | 11/1982 | Levasseur |
| 4,402,609 | A | | 9/1983 | Fetzer et al. |
| 4,409,473 | A | | 10/1983 | Furuta et al. |
| 4,412,607 | A | | 11/1983 | Collins et al. |
| 4,429,778 | A | | 2/1984 | Levasseur |
| 4,478,353 | A | | 10/1984 | Levasseur |
| 4,480,764 | A | | 11/1984 | Takagi et al. |
| 4,494,675 | A | | 1/1985 | Stutsman |
| 4,573,606 | A | | 3/1986 | Lewis et al. |
| 4,590,975 | A | | 5/1986 | Credle, Jr. |
| 4,696,413 | A | | 9/1987 | Wilson et al. |
| 4,705,176 | A | | 11/1987 | Oden |
| 4,736,097 | A | | 4/1988 | Philipp |
| 4,776,487 | A | | 10/1988 | Kurosawa et al. |
| 4,854,477 | A | | 8/1989 | Kurosawa et al. |
| 4,864,121 | A | | 9/1989 | Pietzsch |
| 4,869,392 | A | | 9/1989 | Moulding, Jr. et al. |
| 4,871,054 | A | | 10/1989 | Murray |
| 4,888,532 | A | | 12/1989 | Josson |
| 4,912,316 | A | | 3/1990 | Yamakawa |
| 5,015,840 | A | | 5/1991 | Blau |
| 5,026,983 | A | | 6/1991 | Meyn |
| RE33,668 | E | | 8/1991 | Gray |
| 5,084,845 | A | | 1/1992 | Levasseur |
| 5,111,962 | A | * | 5/1992 | Oden ............................ 221/1 |
| 5,139,127 | A | | 8/1992 | Ficken et al. |
| 5,149,921 | A | | 9/1992 | Picado |
| 5,201,429 | A | | 4/1993 | Hikosaka et al. |
| 5,207,784 | A | | 5/1993 | Schwartzendruber |
| 5,218,196 | A | | 6/1993 | Dogul et al. |
| 5,229,749 | A | | 7/1993 | Yenglin |
| 5,238,145 | A | | 8/1993 | Pippin |
| 5,261,467 | A | | 11/1993 | Yamamoto et al. |
| 5,266,793 | A | | 11/1993 | Smith |
| 5,273,183 | A | | 12/1993 | Tuttobene |
| 5,276,391 | A | | 1/1994 | Jonsson |
| 5,280,845 | A | | 1/1994 | Leight |
| 5,281,809 | A | | 1/1994 | Anderson et al. |
| 5,302,942 | A | | 4/1994 | Blau |
| 5,303,844 | A | | 4/1994 | Muehlberger |
| 5,344,043 | A | | 9/1994 | Moulding et al. |
| 5,346,466 | A | | 9/1994 | Yerlikaya et al. |
| 5,390,711 | A | | 2/1995 | Murphey |
| 5,404,008 | A | | 4/1995 | Malinowski et al. |
| 5,490,610 | A | | 2/1996 | Pearson |
| 5,496,996 | A | | 3/1996 | Barnes et al. |
| 5,574,601 | A | | 11/1996 | Hall |
| 5,625,198 | A | | 4/1997 | Chigira |
| 5,651,476 | A | | 7/1997 | Percy et al. |
| 5,651,479 | A | | 7/1997 | Bates |
| 5,769,269 | A | | 6/1998 | Peters |
| 5,791,516 | A | | 8/1998 | Wittern, Jr. et al. |
| 5,813,568 | A | | 9/1998 | Lowing |
| 5,831,862 | A | | 11/1998 | Hetrick et al. |
| 5,847,389 | A | | 12/1998 | Mertins et al. |
| 5,884,806 | A | | 3/1999 | Boyer et al. |
| 5,922,030 | A | | 7/1999 | Shank et al. |
| 5,927,539 | A | | 7/1999 | Truitt et al. |
| 5,992,030 | A | | 11/1999 | Mann |
| 6,064,921 | A | | 5/2000 | Pippin et al. |
| 6,098,524 | A | | 8/2000 | Reese |
| 6,202,888 | B1 | | 3/2001 | Pollock et al. |
| 6,269,285 | B1 | | 7/2001 | Mignault |
| 6,324,520 | B1 | | 11/2001 | Walker et al. |
| 6,330,958 | B1 | | 12/2001 | Ruskin et al. |
| 6,354,716 | B1 | | 3/2002 | Chen et al. |
| 6,384,402 | B1 | | 5/2002 | Hair, III et al. |
| 6,478,187 | B2 | | 11/2002 | Simson et al. |
| 6,520,373 | B1 | | 2/2003 | Neely et al. |
| 6,540,102 | B2 | | 4/2003 | Gates et al. |
| 6,640,994 | B2 | | 11/2003 | Chen |
| 6,675,985 | B2 | | 1/2004 | Sato et al. |
| 6,708,079 | B2 | | 3/2004 | Mason, II |
| 6,732,014 | B2 | | 5/2004 | Whitten et al. |
| 6,758,370 | B2 | | 7/2004 | Cooke et al. |
| 6,772,906 | B2 | | 8/2004 | Wittern, Jr. et al. |
| 6,794,634 | B2 | | 9/2004 | Hair, III et al. |
| 6,920,372 | B2 | | 7/2005 | Nickerson et al. |
| 2001/0000408 | A1 | | 4/2001 | Hair, III et al. |
| 2001/0000610 | A1 | | 5/2001 | Johnson |
| 2002/0117509 | A1 | | 8/2002 | Whitten et al. |
| 2002/0179620 | A1 | | 12/2002 | Mason, II |
| 2002/0195458 | A1 | | 12/2002 | Whitten et al. |
| 2003/0084959 | A1 | | 5/2003 | Hartnell et al. |
| 2003/0155367 | A1 | | 8/2003 | Chen |
| 2004/0172334 | A1 | | 9/2004 | Whitten et al. |
| 2004/0204791 | A1 | | 10/2004 | Hair, III et al. |

FOREIGN PATENT DOCUMENTS

| | | | |
|---|---|---|---|
| EP | 0 053 489 | | 6/1982 |
| EP | 0 071 438 | A2 | 2/1983 |
| EP | 0 432 996 | | 6/1991 |
| EP | 0 462 591 | | 12/1991 |
| EP | 0 535 856 | | 4/1993 |
| EP | 0 572 119 | A2 | 12/1993 |
| GB | 2 170 792 | A | 8/1986 |
| JP | 02-257386 | | 10/1990 |
| JP | 05-054246 | | 3/1993 |
| JP | 07-282347 | | 10/1995 |
| JP | 09-153172 | | 6/1997 |

| | | | |
|---|---|---|---|
| JP | 09-326075 | | 12/1997 |
| JP | 10-011639 | | 1/1998 |
| WO | WO 99/56255 | | 11/1999 |
| WO | WO 00/74009 | A1 | 12/2000 |
| WO | WO 01/01359 | A1 | 1/2001 |
| WO | WO 01/29788 | A2 | 4/2001 |
| WO | WO 03/052706 A 1 | | 6/2003 |

OTHER PUBLICATIONS

Excerpts from Crane Interrogatory Responses in Civil Action No. 3:03CV88 (confidentiality of submitted responses withdrawn by agreement to allow consideration).
Excerpts from Crane Interogatory Responses in Civil Action No. 3:03-CV-88 (re interrogatories 21-23).
Excerpts from USI's Answers to AMS' First Set of Interrogatories in Civil Action No. 3:04CV-07 (confidentiality of submitted responses withdrawn by agreement to allow consideration).
Excerpts from USI's Answers to AMS' Second Set of Interrogatories in Civil Action No. 3:04CV-07.
NAIS Catalog, 5 pages, 1996.
Nais Sensors Brochure, Aromat Corporation, XPE 001 30M 1296, 1996, p. 47.
NAIS Sensors Brochure, Aromat Corporation, XPE 001 30M1296, 1996, pp. 147-153.
Parts Manual, Kit Kat Candy/Snack Vendor, Model: 3087, P/N 207500, Feb. 1996.
PCT Written Opinion in PCT/US02/1929 dated Jan. 18, 2005.
R-O Internatinal vending machine brochure, indicated as copyrighted Oct. 1997 (2 pages).
Service Manual, Kit Kat Candy Vending Machine, Model 3087-KK, P/N 4206656, Revision C, Jan. 1998.
Sketch by inventors of conventional sensor (no publication date).
SUNX Catalog; 1996, pp. 28-29.
Hair III, et al. Application file material from Re-Examination Control No. 90/009,231 (Re: U.S. Patent No. 7,191,915) filed Jul. 31, 2008.
Hair III, et al. Application file material from Re-Examination Control No. 90/009,232 (Re: U.S. Patent No. 7,343,220) filed Jul. 31, 2008.
Hair III, et al. Application file material from Re-Examination Control No. 90/009,233 (Re: U.S. Patent No. 7,191,915) filed Jul. 31, 2008.
Hair III, et al. Application file material from Re-Examination Control No. 90/009,234 (Re: U.S. Patent No. 7,343,220) filed Jul. 31, 2008.
Declaration of Joseph C. McAlexander, III in Support of AMS's Motion for Preliminary Injunction , in *Automated Merchandising Systems, Inc.* v. *Crane Co.,* and *Seaga Manufacturing, Inc.* Civil Action No. 3:08-CV-0097, (U.S. District Court for the Northern District of West Virginia).
Declaration of Joseph C. McAlexander, III in Support of AMS's Reply Regarding its Motion for Preliminary Injunction , in *Automated Merchandising Systems, Inc.* v. *Crane Co.,* and *Seaga Manufacturing, Inc.* Civil Action No. 3:08-CV-0097, (U. S. District Court for the Northern District of West Virginia).
Declaration of Joseph C. McAlexander, III Pursuant to 37 CFR 1.132 for Reexam Control No. 90/009,232.
Declaration of Joseph C. McAlexander, III Pursuant to 37 CFR 1.132 for Reexam Control No. 90/009,233.
Declaration of Richard W. Koralek, Ph.D., in *Automated Merchandising Systems, Inc.* v. *Crane Co.,* and *Seaga Manufacturing, Inc.,* Civil Action No. 3:08-CV-97, (U.S. District Court for the Northern District of West Virginia).
Excerpts from Hearing Transcript of Oct. 22, 2008, in *Automated Merchandising Systems, Inc.* v. *Crane Co.,* and *Seaga Manufacturing, Inc.,* Civil Action No. 3:08CV-97 (US District Court Northern District of West Virginia).
Order Granting Plaintiff's Motion for Preliminary Injunction, Granting Defendant's Motion for Consolidation and Stay, and Granting Plaintiff's Motion for a Protective Order, in *Automated Merchandising Systems, Inc.* v. *Crane Co.,* and *Seaga Manufacturing, Inc.,* Civil Action No. 3:08-CV-97 (U. S. District Court for the Norther.
Supplemental Declaration of Richard W. Koralek, Ph.D., in *Automated Merchandising Systems, Inc.* v. *Crane, Co.,* and *Seaga Manufacturing, Inc.,* Civil Action No. 3:08-CV-97, (U.S. District Court for the Northern District of West Virginia).
Automatic Products—UltraFlex brochure.
NAMA 1977 National Convention Invitation.
National Vendors—Imperial Crown brochure.
Wurlitzer brochure.
Wurlitzer Spiral Vending brochure.
Plaintiff AMS' Motion to Lift Stay, Docket Entry No. 172 in Civil Action•No. 03-CV -00088, *Automated Merchandising Systems, Inc.* v. *Crane Co.*, in the United States District Court for the Northern District of West Virginia.
Amended Reply in Support of Motion for Preliminary Injunction, Docket Entry No. 60 in Civil Action•No. 08-CV-00097, *Automated Merchandising Systems, Inc.* v. *Crane Co.*, in the United States District Court for the Northern District of West Virginia.
AMS Appeal Brief in merged Control Nos. 90/007,450, 90/007,454 and 90/007,461 daed May 29, 2007.
Examiner's Answer mailed Sep. 24, 2007 in merged Control Nos. 90/007,450, 90/007,454 and 90/007,461.
Decision of USPTO Board of Appeals, dated Jun. 26, 2009, in merged Control Nos. 90/007,450, 90/007,454 and 90/007,461.
AMS Appeal Brief in merged Control Nos. 90/007,451,90/007,453 and 90/007,462 dated May 29, 2007.
Examiner's Answer mailed Sep. 21, 2007 in merged Control Nos. 90/007,451, 90/007,453 and 90/007,462.
Decision of USPTO Board of Appeals, dated Jun. 26, 2009, in merged Control Nos. 90/007,451,90/007,453 and 90/007,462.
Declaration of Joseph C. McAlexander, III in Support of AMS' Reply Regarding Its Motion for Preliminary Injunction, Docket Entry No. 60-2in Civil Action No. 08-CV -00097, *Automated Merchandising Systems, Inc.* v. *Crane Co.*, in the United States District Court for the Northern District of West Virginia.
Statement Under 37 C.F.R. § 1.51O(B)(1) Identifying Substantial New Questions of Patentability Based on Prior Patents and Printed Publications in Reexaminationa Control No. 09/007,572.
Information Disclosure Statement filed Dec. 8, 2000 in U.S. Appl. No. 09/261,221, with attachment.
Substitute Statement Pointing Out Substantial New Questions of Patentability and Appendix, filed with the USPTO on Oct. 28, 2009, Control No. 90/009,569, Re: USP No. 6,384,402.
Substitute Statement Pointing Out Substantial New Questions of Patentability and Appendix, filed with the USPTO on Oct. 30, 2009, Control No. 90/009,570, Re: USP No. 6,794,634.
90/009,233 Mar. 09, 2009 Response to Office Action dated Feb. 5, 2009.
90/009,233 Examiner's Interview Summary dated Feb. 26, 2009.
90/009,233 Office Action dated Feb. 5, 2009.
90/009,233 Patent Owner's Interview Summary dated Mar. 9, 2009.
U.S. Reexam Control No. 90/009,569 - Dec. 22, 2009 Order Granting Request for Ex Parte Reexamination.
U.S. Reexam Control No. 90/009,570 - Dec. 24, 2009 Order Granting Request for Ex Parte Reexamination.
U.S. Reexamination Control No. 90/007,454 - Jun. 26, 2009 Board of Patent Appeals and Interferences Decision in Appeal 2008-005779.
U.S. Reexamination Control No. 90/007,462 - Jun. 26, 2009 Board of Patent Appeals and Interferences Decision in Appeal 2008-005966.
U.S. Reexamination Control No. 90/009,231 - Sep. 19, 2008 PTO Decision Denying Reexam.
U.S. Reexamination Control No. 90/009,232 - Sep. 19, 2008 PTO Order Granting Request for Ex Parte Reexamination.
U.S. Reexamination Control No. 90/009,232 - Feb. 26, 2010 Notice of Intent to Issue Ex Parte Reexamination Certificate.
U.S. Reexamination Control No. 90/009,233 - Sep. 19, 2008 PTO Decision Granting Reexam.
U.S. Reexamination Control No. 90/009,233 - Feb. 26, 2010 PTO Final Office Action.
U.S. Reexamination Control No. 90/009,234 - Sep. 19, 2008 PTO Decision Denying Reexam.
U.S. Reexamination Control No. 90/009,569 - Mar. 12, 2010 PTO Office Action.
U.S. Reexamination Control No. 90/009,570 - Mar. 12, 2010 PTO Office Action.
U.S. Reexamination Control No. 90/009,569 - Sep. 8, 2009 Request for Reexam.

U.S. Reexamination Control No. 90/009,570 - Sep. 8, 2009 Request for Reexam.
Feb. 6, 2009 Office Action in 90/009,232.
Mar. 16, 2009 Supplemental Response and attached John Hens Declaration.
Mar. 9, 2009 response in 90/009,232 to the Feb. 6, 2009 Action.
One copy of each attachment filed with the Mar. 9, 2009 Re-exam response.
Patent Owner's Statement of the Substance of the Interview.
Petition for Extension of Time.

* cited by examiner 3B
3C
3D
3E
38
46
48
54
68

OPTICAL VEND-SENSING SYSTEM FOR CONTROL OF VENDING MACHINE

CROSS-REFERENCE TO RELATED APPLICATIONS

This application is a continuation of U.S. patent application Ser. No. 11/639,231 filed on Dec. 15, 2006 which is a continuation of U.S. patent application Ser. No. 10/838,222 filed on May 5, 2004, now U.S. Pat. No. 7,191,915, which is a continuation of U.S. patent application Ser. No. 09/729,853 filed on Dec. 6, 2000, now U.S. Pat. No. 6,794,634, which is a continuation of U.S. patent application Ser. No. 09/261,221 filed on Mar. 3, 1999, now U.S. Pat. No. 6,384,402, which claims priority to U.S. Provisional Application No. 60/083,522 filed on Apr. 29, 1998. The entire contents of each of these applications are herein incorporated by reference.

BACKGROUND OF THE INVENTION

1. Field of the Invention

The present invention pertains to a machine that dispenses objects and detects the dispensed objects with an optical sensor, and more particularly to an optical vend-sensing system and a vending machine that has an optical vend-sensing system.

2. Description of Related Art

In a typical glass-front vending machine, the user of the machine sees a glass-fronted cabinet, with a selector panel located off to one side of the glass. Through the glass, there can be seen an array of articles, typically packaged snack foods arranged in horizontal columns which extend horizontally in a front-to-rear depthwise direction, with a plurality of columns at each of several vertically spaced levels. At each level the articles are pocketed in-between adjacent turns of respective spirals arranged one or two to a column. Each spiral has an axially central rearwardly projecting stem at its rear, which is plugged into the chuck of a respective motor assembly mounted to the rear of a tray. When a user makes the requisite payment to the machine and makes a desired selection on the selector panel, the spiral or spirals for the respective column begin to turn causing all of the packaged articles received among the spiral turns in that column to advance. If the vending machine is working properly, the respective spiral or spirals turn sufficiently to cause the leading packaged article in the respective column to be conveyed sufficiently far forwards that the package loses support provided from underneath by a respective tray, and tumbles down past the front of the respective shelf, through a vend space between the fronts of the columns and the back of the glass front, into an outlet bin, from which the user can retrieve it, typically by temporarily pushing in a hinged from above, normally closed door. Again, if the machine is working properly, the respective spiral or spirals cease being turned by the respective motor assembly before the next-in-line, newly leading package in the respective column mistakenly becomes conveyed so far forwards that it, too, falls off the tray, down through the vend space and becomes vended without a requisite payment having been made.

Several different unplanned occurrences can occur, and the possibility and likelihood of their occurrence complicates the design of glass-front vending machines.

It is important that users, upon making requisite payment, be reliably vended the product which they have selected, without any deficiency or bonus, and without any need, or apparent desirability for expending unusual effort, or that the user automatically be provided a return of payment, or the opportunity to make another selection.

Spatial orientation of packages and wrinkling of packaging, unusual distribution of contents of a package, unusual tumbling of a package through the vend space, an empty pocket in a spiral and similar factors all can cause mis-vending, particularly if the machine is one in which a spiral is made to turn through only a predetermined angular distance for vending a selected product, or the package being vended, depending on how it falls, can bypass a detector meant to terminate rotation of the respective spiral or spirals upon detecting that a package has been vended.

Many glass-front vendors are modularly constructed, so that the number of vertically-spaced rows of product columns, and/or the number of laterally spaced columns per row can be changed either at the time the machine is ordered by its purchaser, or in the field, or both. This fact also complicates provision of reliable vending, particularly if adding and deleting columns necessitates adding and deleting sensors and making sure that the sensors are properly positioned and correctly operating. Addition of sensors also adds to expense.

It is known in the art to provide an emitter and detector which provide a beam in a confined space through which the vended product will fall. However, there is some chance that the falling product, through happenstantial orientation will fail to break the beam, or will apparently fail to break the beam, and therefore not be detected. There is also a possibility that in constricting the space through which the product must fall, happenstantial orientation will cause the product to bridge and become lodged in the constricted space, having been detected but not having been successfully vended.

Others have provided vend sensors in which the impact on the outlet chute of a comparatively heavy vended article such as a can or bottle, is sensed as a vibration. However, such sensing is not economically feasible where at least some of the products being vended are very light in weight, such as is the case where a small number of large potato chips are presented in a facially large but light in weight package made of synthetic plastic film.

A particularly difficult situation is presented when some of the products to be dispensed are large so that a large transverse cross-sectional area is required for the vend space, but others of the products are so small that an optical beam meant to be broken by the product could be missed due to happenstantial path of movement and changing spatial orientation of the falling product being vended.

Some terminology used in this document is used in an exemplary way which is not intended to limit the applicability of the broader concepts of the invention. For instance, the terms article, packaged product, product and the like are not intended to limit the concept of what object can be vended, or otherwise dispensed. Use of the term glass is not intended to mean that the front of the vendor cannot in whole or in part be made of another material.

Although the manufacturing costs may be lower, there can be more risk of faulty operation if a rotary spiral-type vending machine is designed simply to have the respective spiral or spirals turn through a prescribed number of degrees and/or for a prescribed amount of time before ceasing to turn, i.e. without any vend sensor. The customer who sees the machine quit operating but not having received a product, which may be noticeably close to being vended, may rock the machine thinking to provide enough physical encouragement as to accomplish the vending of the product, but result in damaging the machine and perhaps injuring themselves.

And, to the extent that the cost of providing a 'home' switch for terminating motor operation after each respective spiral has turned through the angular distance calculated to be sufficient to vend a product adds to the cost of the machine, vending control based on extent of rotation limitation may not be less expensive than vend sensing.

SUMMARY OF THE INVENTION

Accordingly, it is an object of this invention to provide an optical vend-sensing system which detects an object that has actually been vended.

It is another object of this invention to provide an optical vend-sensing system which detects vended objects which are of various sizes and shapes.

It is another object of this invention to provide an optical vend-sensing system which is robust against background noise and stray signals and against intentional attempts to disrupt the detection system.

It is yet another object of this invention to provide a vending machine which has an optical vend-sensing system as indicated above.

It is another object of this invention to provide a method of detecting a dispensed object with an optical sensor which can detect dispensed objects of various sizes and shapes.

It is another object of this invention to provide a method of detecting a dispensed object such that it is robust against background noise, interference signals, and intentional attempts to disrupt the operation of the system.

For ensuring that a vending machine motor will continue to operate until a product has descended through a vending space or an established time interval has elapsed, a continuous optical beam is established across the vend space through which a product must drop. Preferably, the beam is thin for good sensitivity, but not so thin that it leads to alignment problems. A change in beam intensity is detected. In a first embodiment, infra-red light is emitted by a row of emitters, spread into a beam by a diffuser, and detected by a segmented detector arrangement, including two side by side curved, mirrored-surface collectors. The collectors have a reflecting surface that is a section of a parabola that focuses the collected light onto a photodiode disposed substantially at the focal point of the parabolic surface.

In a second embodiment of the invention, the collector is a heel-shaped component which has a first reflecting surface that is substantially flat. The flat reflecting surface of the collector in the second embodiment of the invention reflects the incoming light in the direction of the edge of the heel-shaped collector. The heel-shaped collector has an edge that is substantially parabolic and is a second reflecting surface. Light reflected from the parabolic edge of the heel-shaped collector is reflected to a photodiode or a dimple reflector constructed and arranged substantially at the focal point of the parabolic edge of the heel-shaped collector. The surface of the dimple reflector is preferably substantially an inverted parabolic shape such that the light incident on the dimple reflector is redirected as a substantially collimated beam directed substantially normally to the heel-shaped collector, substantially at the focal point of the parabolic edge of the heel-shaped reflector. An electromagnetic radiation detecting element, such as a photodiode, is disposed in the path of the collimated beam formed by the dimple reflector.

In a third embodiment of the invention, a substantially elliptical reflector has an inner reflecting surface which is formed like an elliptical belt. In the preferred embodiment, a single emitter is disposed substantially at a first focal point of the elliptical reflector. More preferably, a dimple reflector is disposed substantially at the first focal point of the elliptical reflector such that light provided by the emitter in a direction orthogonal to the plane of the elliptical reflector is redirected towards the reflecting surface of the elliptical reflector, substantially in the plane of the elliptical reflector.

An electromagnetic radiation detecting element is disposed at the second focal point of the elliptical reflector in the second embodiment of the invention. More preferably, a second dimple reflector is provided at the second focal point of the elliptical reflector and a photodiode is disposed proximate to the dimple reflector such that light reflected by the elliptical reflector and converged onto the dimple reflector at the second focal point of the elliptical reflector is redirected substantially in a collimated beam orthogonal to the plane of the elliptical reflector. This provides a band of electrical magnetic radiation, preferably infra-red light, within an interior region defined by the elliptical reflector. An object to be detected, such as a vended item, passes through the beam of light provided within the interior region defined by the elliptical reflector.

In each of the three currently preferred embodiments, the photodiode provides an output signal which is processed to determine whether an object has passed through the beam of preferably infra-red light. In general, the band of electromagnetic radiation can be provided in either a continuous wave or a pulsed mode. In the preferred embodiments, the electromagnetic radiation is pulsed infra-red radiation.

BRIEF DESCRIPTION OF THE DRAWINGS

A preferred embodiment of the invention is described in more detail with reference to the attached drawings, in which.

DETAILED DESCRIPTION

Figure 1:
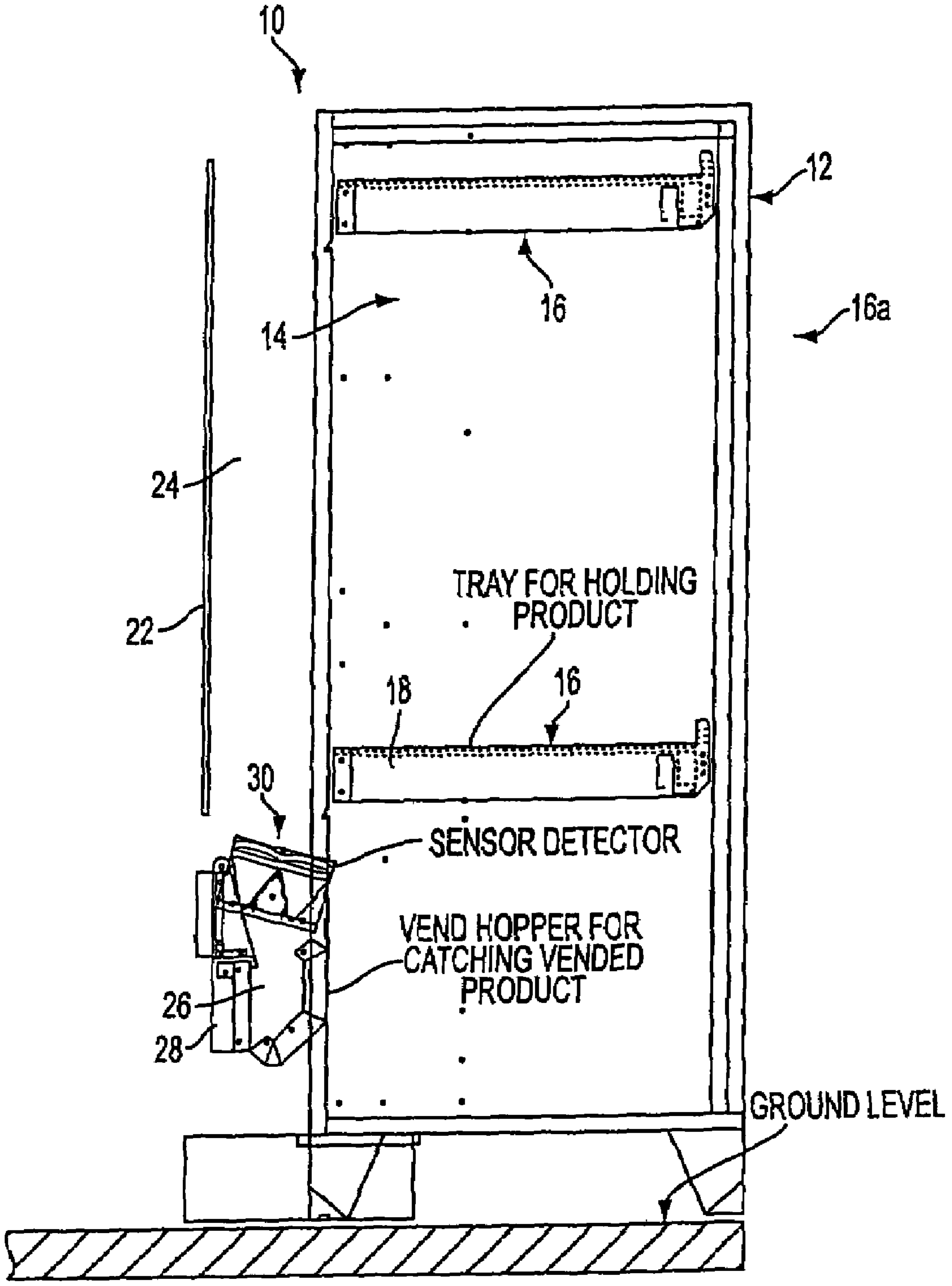
FIG. 1 is a schematic vertical longitudinal sectional view of a glass front vending machine provided with an optical vend sensor in accordance with principles of the present invention.

An exemplary vending machine in which the optical vend-sensing system of the invention may be provided and used, is schematically illustrated at 10 in FIG. 1. Much of the conventional structure has been omitted. In general, the vending machine 10 is shown including a cabinet 12 having opposite sidewalls, a back wall, a top wall and a bottom wall which cooperatively define a forwardly facing cavity 14 arranged to have a plurality of tray assemblies 16 mounted therein at a plurality of vertically spaced levels. In general, the vending machine has an electromechanical dispensing unit 16*a*. In the example illustrated in FIG. 1, the electromechanical dispensing unit 16*a* includes the tray assemblies 16. Each tray assembly 16 has a plurality of motorized horizontally arranged spirals which are spaced from one another widthwise of the tray, and each of which extends longitudinally in a front-to-rear depthwise direction of the tray. Each spiral plugs into the driving chuck of a respective drive motor which is arranged to undirectionally rotate the spiral about the longitudinal axis of the spiral. In addition to the left, right upstanding flanges 18 used for mounting the tray assembly to the cabinet 12 preferably using drawer-mounting hardware which permits each tray assembly to be pulled out like a drawer, and a rear flange for mounting each motor assembly, the tray assembly includes a horizontal tray surface which underlies all of the spirals to provide support for the spirals and for the packaged products that are received in the respective upwardly opening pockets formed between neighboring turns of the respective spirals. Some columns may have one spiral per column; others may have two coordinately counter rotated spirals per column, with upstanding sidewall flanges mounted on the tray to divide columns from one another.

Spaced, for example, about 9 inches (23 cm) in front of the front edges of the tray assemblies as a panel in an openable/lockable door (not shown), is a glass front 22, through which a prospective customer can view the leading packaged products available for being vended upon operation of the machine. The door, to one side of the glass front, further includes a selector panel, or generally a payment and selection unit, (not shown) which includes means for accepting payment from the user, and for the user to select which column he or she wishes to receive the leading packaged product from. Vending, upon selection, is accomplished by causing the respective motor assembly or assemblies for the spiral or spirals of the respective column to turn through a sufficient angular distance, as to advance all of the products nested in the turns of the respective spiral or spirals forward such that the leading one loses support from below as it reaches the front of the respective tray support surface and the runout at the front end or ends of the respective spiral or spirals, and drops through the vend space 24 behind the glass front 22, down into a vend hopper 26, from which it can be retrieved by the customer, by temporarily pushing in from the bottom on the top-hinged, resiliently urged closed door 28. (Typically, the door 28 is the outer part of a double-door arrangement configured such that as the user pushes in the outer door, a normally open inner door (not shown) at the top of the vend hopper correspondingly temporarily closes, for denying the user upward access to the vending machine cavity 14 via the vend hopper door 28.

The present invention concerns an optical vend-sensing system, the article sensing subsystem of which is arranged athwart the vend space 24 immediately above the vend hopper 26, at 30, and a vending or dispensing machine that has such an optical vend-sensing system.

Figure 2:
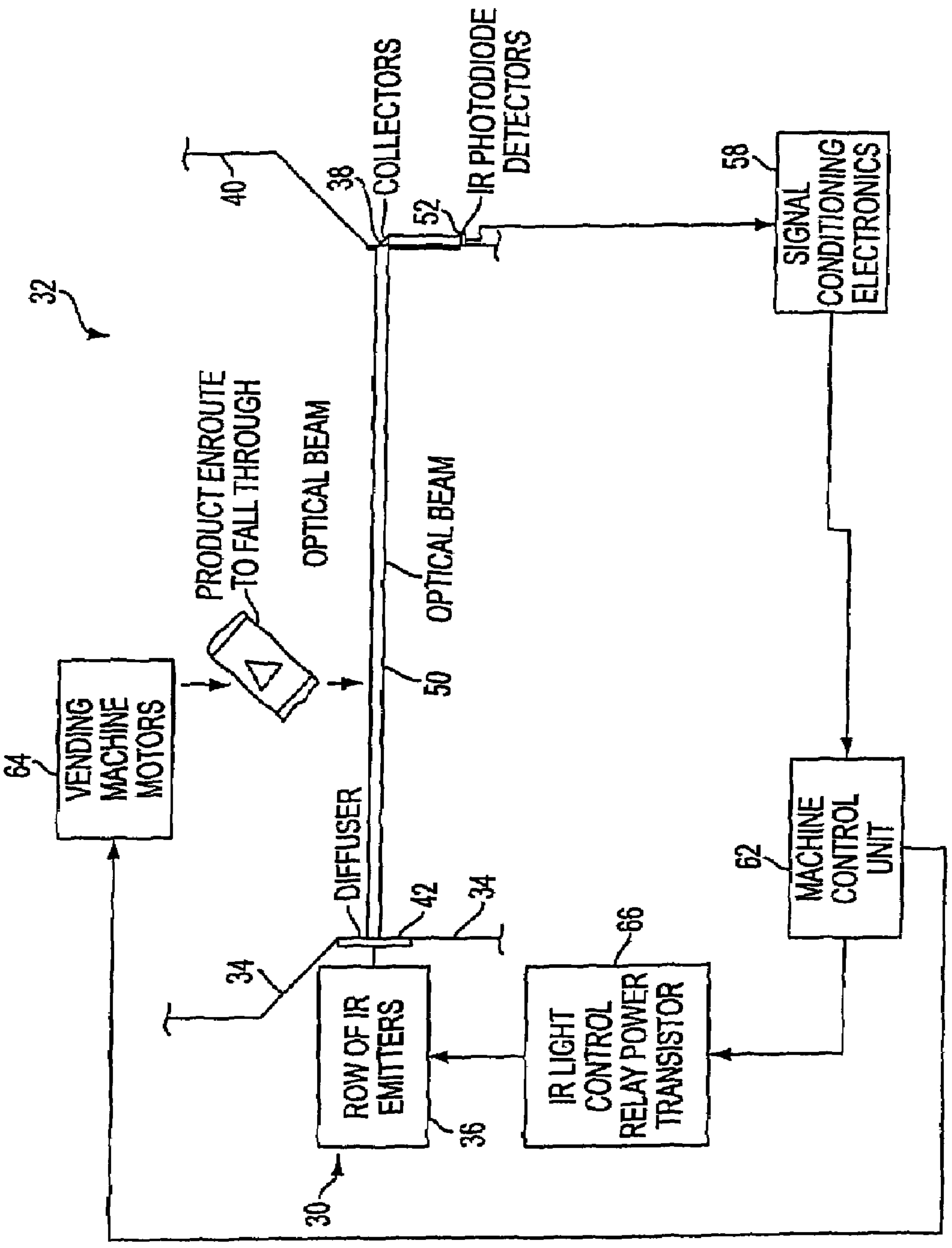
FIG. 2 is a block diagram of elements of the optical vend sensor of the present invention.
Figures 3A, 3B, 3C, 3D, 3E, 3F:
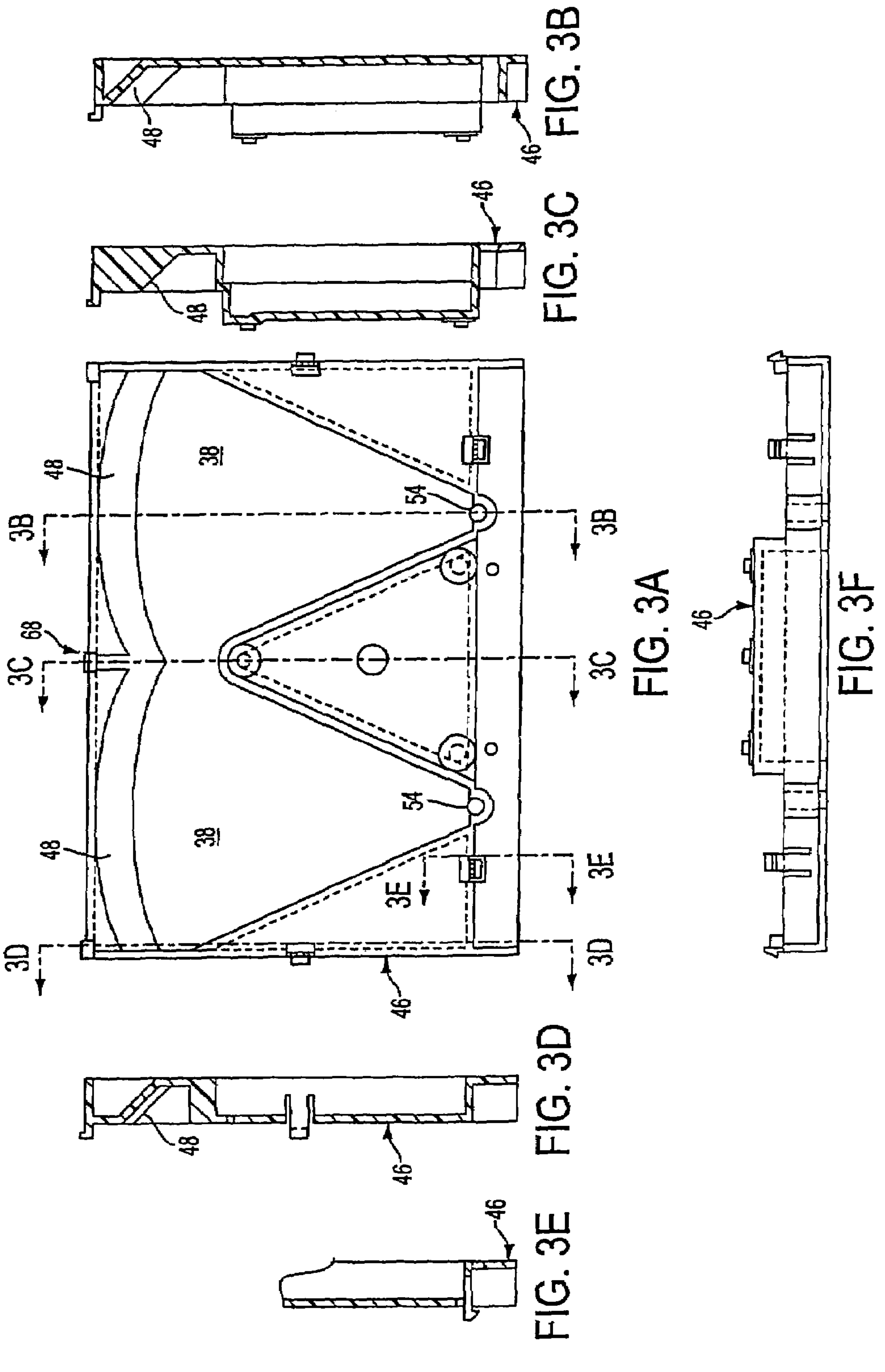
FIG. 3A is a front elevational view of a first embodiment of the collector body for the sensors of the optical vend sensor of the present invention.
FIGS. 3B-3E are cross-sectional views of the collector body, respectively taken on lines 3B-3B, 3C-3C, 3D-3D and 3E-3E, of FIG. 3A.
FIG. 3F is a bottom plan view of the collector body of the first embodiment.

A first embodiment of the optical vend-sensing system 32 is schematically and diagrammatically illustrated in FIG. 2 in which, mounted behind an opening in a fairing wall 34 of the cabinet, is at least one and preferably a row 36 of electromagnetic radiation emitters, preferably arranged to emit infra red radiation across the vend space 24, towards at least one and preferably a side-by-side pair of collectors 38 mounted behind an opening in a fairing wall 40 of the cabinet.

By preference, the opening just mentioned is glazed with a diffuser panel 42, which may be of the material and design conventionally used for diffusing light from fluorescent light tubes in overhead lighting fixtures of offices. Either opening could be simply open or glazed by a non-patterned transparent or translucent glass or plastic panel.

By preference, the IR emitters 36 are provided in plurality and arranged so that, in combination with the diffuser 42, they provide a thin plane of electromagnetic radiation which is generally horizontal (though somewhat tilted for manufacturing considerations, as suggested by the tilted orientation of the subsystem 30 as shown in FIG. 1), and so extensive and pervasive that even the smallest dispensed package or article falling through the vend space 24 cannot but momentarily diminish the radiation reaching the collectors 38 from the emitters 36 just before the package or article falls into the vend hopper 26.

As one may see in FIGS. 3A-3F, the collectors 38 preferably are provided on a body 46 that preferably is molded of synthetic plastic material, and all matte black on its front side, except for its two horizontally and downwardly facing parabolic mirrored surfaces 48. These are arranged immediately side by side as adjoining arches, to effectively cover on the collection side, the entire front-to-rear dimension of the band of radiation coming from the emitters 36 as affected by the diffusers.

The number of arches could be one, three or more, two being preferred for manufacturing considerations. A collector with one arch has advantages that one mirror is cheaper to manufacture than two, and it would require one less detector and less circuitry than the two-arch case. In addition, a single mirror with a single detector has an advantage of higher sensitivity. With two or more detectors connected essentially in parallel, any signal from one is attenuated by the constant current flowing through the others if they are not similarly occluded. The signals are averaged over the number of detectors. In addition, one detector does not have a problem with non-uniformities in sensitivity due to manufacturing tolerances of the detectors.

The collector body 46 is arranged for mounting of respective detectors, preferably IR photodetectors 52 (FIG. 2) at the foci 54 of the respective collector mirrors 48 in one embodiment of the invention.

The system of FIG. 2 further includes other signal conditioning electronics 58 operatively interposed between the detectors 52 and the vending machine control unit 62 of the vending machine 10, to which the vending machine motors 64 (i.e. for turning the spirals) are operatively connected. The vending machine control unit has a commanding relationship with an IR light control relay and power transistor arrangement 66 which powers the IR emitters 36.

Further by way of providing an overview of the vend-sensing system, in use, the detector circuitry picks-up ambient light on both of the collectors 38 as detected by both of the detectors 52 with the emitters 36 turned off, and the microcontroller, i.e. the machine control unit 62 stores the respective value. Then, the microcontroller turns on the emitters 36, whereupon the system takes another reading from the detectors 52, and compares that with the previously stored reading from when the emitters were off. These two results are differenced to obtain a reference value which equates to the strength of the beam of radiation of the thin plane as sensed at the detectors, after correcting for ambient radiation at the same wavelengths that is not due to emissions by the emitters 36, this reference value being determined when no products are falling through the beam and the beam is not otherwise obstructed. By preference, the step of acquiring a reference value is practiced several times, until results converge on a median which can be used as the reference value.

Sensing of a product drop through the beam 50 involves sensing that the radiation reaching the detectors as a result of operation of the emitters has temporarily diminished by a preselected amount, which the machine control unit 62 registers as a product drop, for the purpose of terminating operation of the respective helix-rotating motor or motors.

To the extent that there is a small dead space at 68 (FIG. 3A) between the two mirrors, such that a small product falling with a happenstantial orientation could especially slightly diminish the amount of radiation reaching the detectors, it is preferred that in practicing this embodiment of the invention, the signals from both the photodiodes 52 be added for comparison with the reference value.

Figure 4:
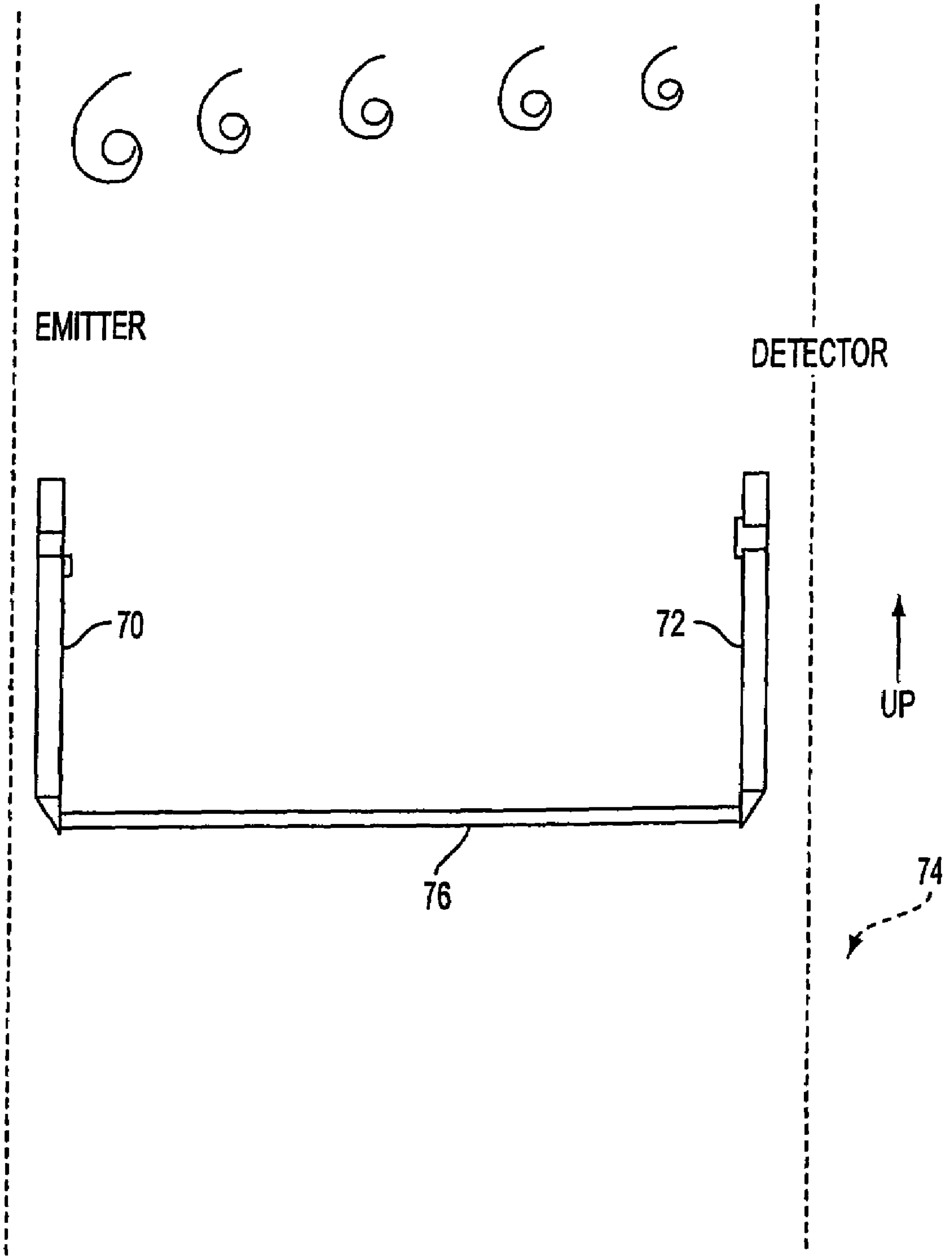
FIG. 4 illustrates a second embodiment of the collector in which there is a corresponding emitter.

The optical components of a second embodiment of the invention are illustrated in FIG. 4 so as to show schematically the arrangement of the optical vend system in a vending machine. The optical vend-sensing system according to the second embodiment has a diverging element 70 and a collector 72. The diverging element 70 and collector 72 are disposed in the vending machine body 74 so as to provide a flat and beam 76 which substantially subtends a region of the vending machine where a vended object will pass during vending. A bank of LEDs could alternatively replace the diverging element 70, as in the first embodiment: Similarly, the first embodiment could also employ diverging elements that are substantially the same in structure as the collectors 38 instead of a bank of LEDs.

Figure 5A:
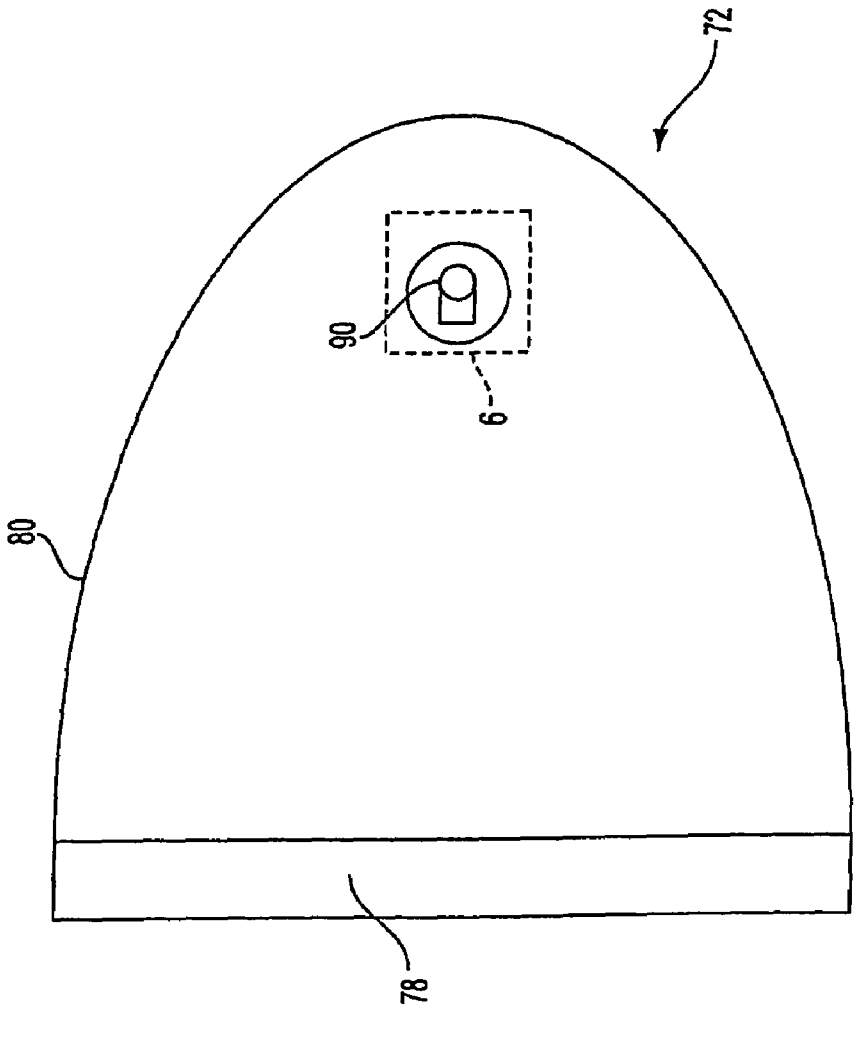
FIG. 5A is a plan view of the second embodiment of the collector.

FIG. 5A shows a plan view of the collector 72. Since the diverging element 70 is substantially the same in structure as the collector 72, it is not shown in detail. Preferably, the collector 72 is of a solid transparent material. Plexiglas or polycarbonate are suitable low-cost materials. The collector 72 has a first reflecting surface 78 that is substantially flat. The reflecting surface 78 may be provided by depositing metal, on the outer surface of the collector 72. A metal may be selected from aluminum, silver, gold, or other metals conventionally known for providing reflective surfaces, based on the specific application.

Figure 5B:
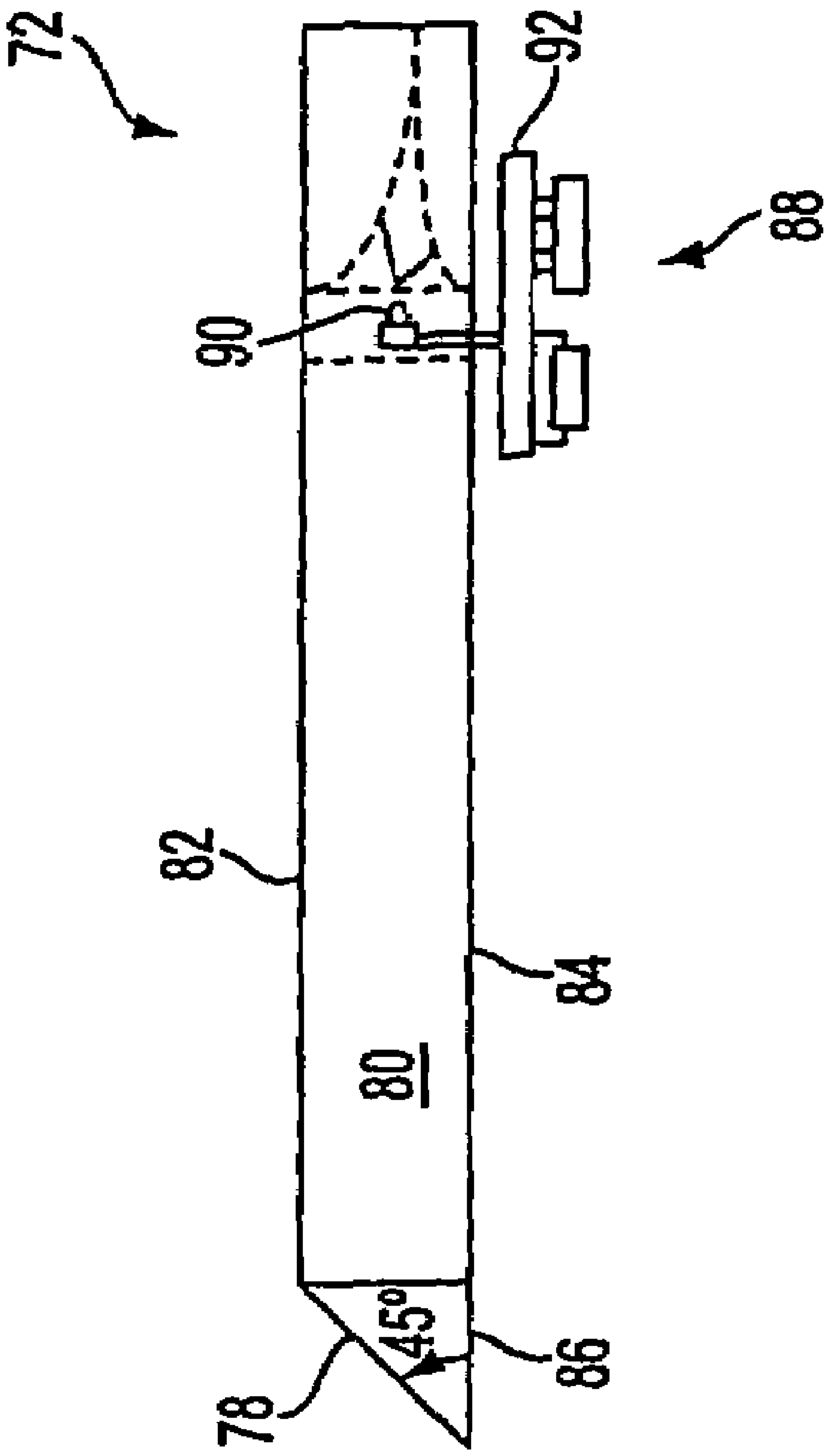
FIG. 5B is a side view of the second embodiment of the collector.

The collector 72 has a second reflecting surface 80 which is substantially a parabolic shape as illustrated in the plane of FIG. 5A. FIG. 5B shows a side view of the collector 72. The top of the collector 72 is painted black to shield the collector from extraneous light. Similarly, the bottom 84 of the collector 72 is painted black, except at a transparent region 86, which permits light from the flat and beam 76 to enter and reflect from the first reflecting surface 78. Preferably, the detector 88 has an electromagnetic detecting element 90 disposed substantially at a focal point of the second reflecting surface 80, and an electronic circuit board 92.

Figure 6:
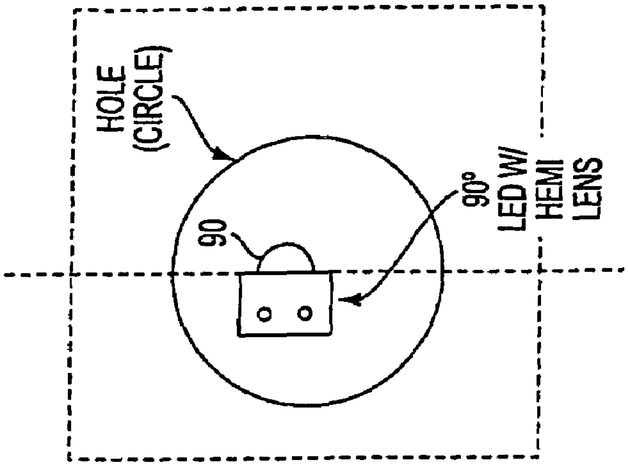
FIG. 6 is an enlarged view of a section of the collector shown in FIG. 5A.

The diverging element 70 (FIG. 4) provides a flat and beam 76 by diverging light from an emitter (not shown) such as an LED. The flat and beam 76 enters the collector 72 through the transparent region 86 to be reflected from the first reflecting surface 78 and reflected from the second reflecting surface 80. The light reflected from the second reflecting surface is focused on the electromagnetic radiation detecting element 90 which is preferably a photodiode (see, FIG. 6).

Figure 7:
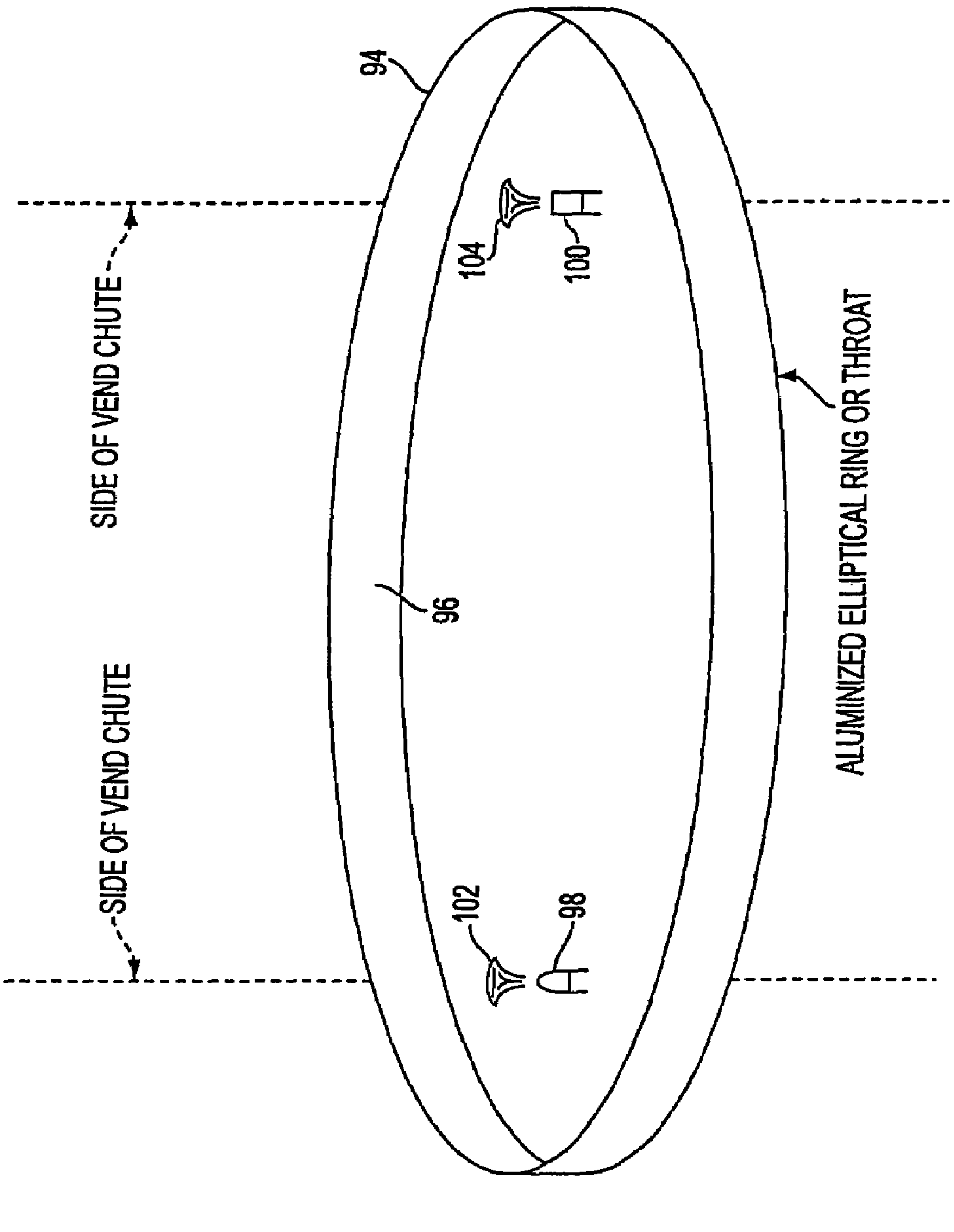
FIG. 7 is a perspective view of a combined emitter/collector structure according to a third embodiment of the invention.
Figure 8:
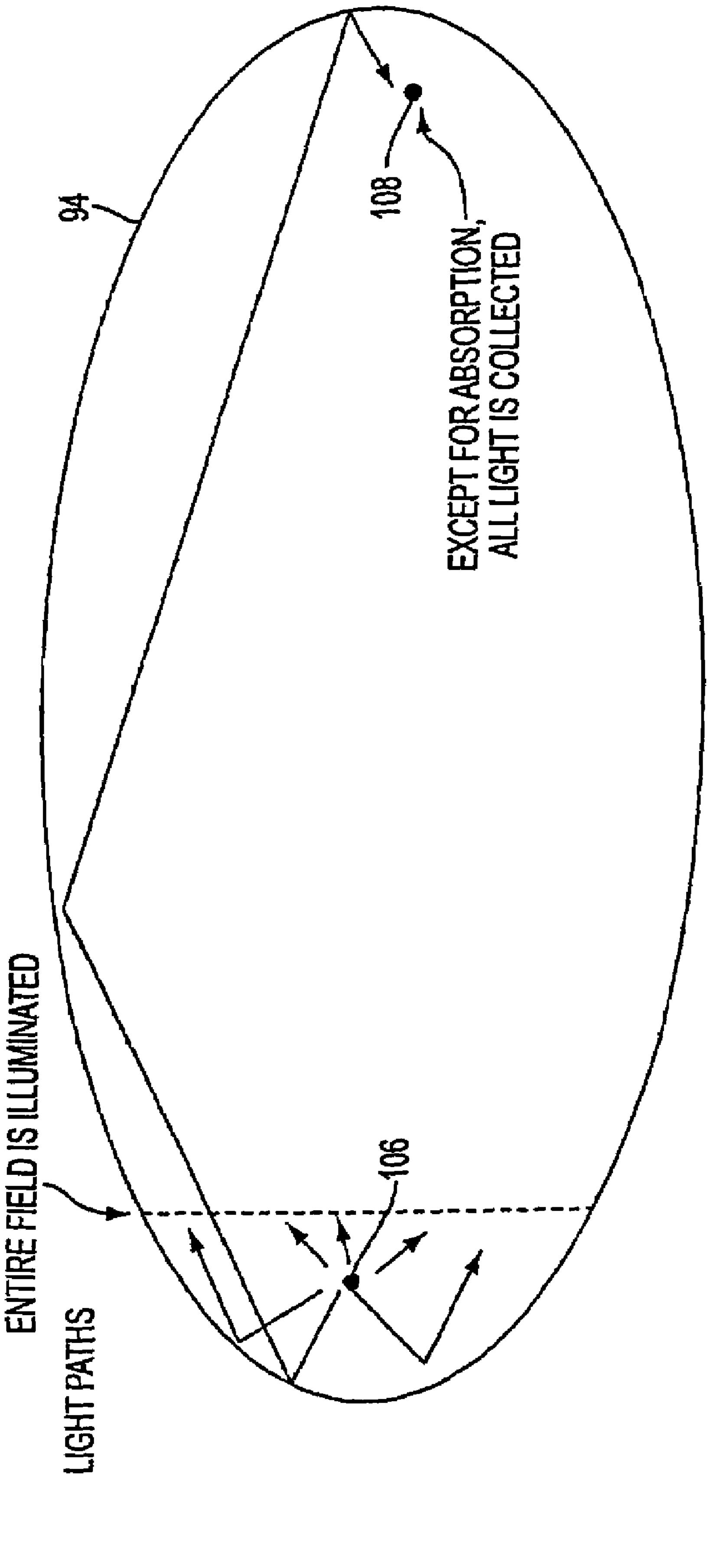
FIG. 8 is a plan view in the plane of the elliptical reflector according to the third embodiment of the invention schematically illustrating light propagation in the system.

FIG. 7 illustrates the optical components of a third embodiment of the invention. The optical vend-sensing system according to the third embodiment of the invention has a substantially elliptical reflecting ring 94. The reflecting ring 94 is constructed and arranged to span the vending chute of the vending machine such that vended, or otherwise dispensed, objects pass through an inner space defined by the reflecting ring. The inner surface of the reflecting ring 94 is a reflecting surface 96. An emitter 98 is disposed proximate to a first focal point for the elliptical reflecting ring 94 and an electromagnetic radiation detecting element 100 is disposed proximate to the opposing focal point of the elliptical reflecting ring 94. The emitter 98 and detector 100 are each supported by conventional mechanical supports which are not shown in FIG. 7. Preferably, a first dimple reflector 102 is disposed substantially at a first focal point of the elliptical reflecting ring 94, and a second dimple reflector 104 is disposed at the opposing focal point of the reflecting ring 94. The dimple reflectors 102 and 104 have substantially inverted parabolic surfaces. The substantially parabolic reflecting surfaces of the second dimple reflector 104 direct light reflected from the reflecting surface 96 into a substantially collimated beam that is substantially perpendicular to a plane of the elliptical reflecting ring 94. The emitter 98, in combination with the first dimple reflector 102, operates in a similar manner to the second dimple reflector and electromagnetic radiation detecting element 100, but in a reversed light-travel direction. In other words, a collimated light beam emitted from the emitter 98 is reflected by a dimple reflector 102 such that it is dispersed to substantially fill an interior region defined by the elliptical reflecting ring 94 with emitted electromagnetic radiation. In the preferred embodiment, the emitter 98 is a light emitting diode (LED). FIG. 8 is a schematic illustration shown in a plane of the elliptical reflecting ring 94 to schematically illustrate the paths followed by a few representative light rays. Light rays emanating substantially from a first focal point 106 of the reflecting ring 94 substantially reconverge on a second focal point 108 of the reflecting ring 94. The optical system according to the third embodiment of the invention provides an efficient means for directing light from the emitter 98 to substantially fill an interior region defined by the reflecting ring 94, and then collecting substantially all of the emitted light at the opposing focal point of the reflecting ring 94.

For successful operation, it is necessary that the system detect objects having a narrowest dimension equivalent to that of the narrowest article likely to be vended by the machine, e.g. 0.25 inch (0.6 cm), while the object is falling at any velocity which forcibly will occur in the vending machine. The vend-sensing system, by preference, is arranged to reject false negative states, and to allow false positive states to the extent that false positive states are introduced by the operator.

In the following discussion the terms emitter, collector and detector are sometimes used in the singular, without intending thereby to require that any structure be provided in the singular, the preferred numbers of these elements being as described above.

In a first embodiment, the vend-sensing system works by sensing perturbations of the steady-state intensity of a flat band of electromagnetic radiation, preferably infrared light. In the currently preferred embodiment of the vend-sensing system, the emitter produces a pulsed, beam of electromagnetic radiation which is also preferably infrared light. In a pulsed mode of operation, the general concept is that the detected pulses of light exceed a detection threshold when no object is located in the beam of light, but fail to exceed the detection threshold for pulses emitted when an object is located within the detection region thus intercepting at least a portion of the beam of light. The detection threshold is generally selectable according to the desired detection sensitivity. In the preferred embodiment, the pulses of infrared radiation are emitted at substantially regular intervals with substantially the same pulse width. The frequency of the pulses is chosen to be greater than frequencies for commonly occurring background sources, such as 60 Hz and 120 Hz, so as to permit filtering out the low frequency background sources. Although pulses that have substantially constant widths and substantially constant inter-pulse intervals is currently preferred, the general concept of the invention includes emitting coded pulses. An embodiment that uses coded pulses would require increased complexity in the vend-sensing circuitry, but it would provide greater security against individuals who attempt to trick the vend-sensing system.

In the currently preferred embodiments, the vend-sensing system is comprised of three subsystems: An emitter, a collector and a detector. A pulsed band of light is generated by the emitter across a gap and focused onto a photoelectric transducer within the collector in the preferred embodiment. As we noted above, the invention is not limited to operating only in a pulsed mode. The general concept of the invention includes using a "continuous-wave" emitter to provide a substantially constant, beam of electromagnetic radiation but this is not currently the most preferred mode. Objects placed inside this gap partially or totally occlude the light beam and so vary the output from the collector. The detector includes a circuit which translates the collector's output signal into a true or false detection signal.

The protocol used in the preferred embodiment asserts that each pulse delivered by the emitter must be detected when there is no object in the detection region. The broader concept of the invention includes permitting a certain number of undetected pulses when there is no object in the detection region. In the preferred embodiment, the pulse frequency is selected to be sufficiently large such that a plurality of pulses are emitted during the traversal of an object through the detection region. If a number n of consecutive output pulses are below the detection threshold, then a detection of a dispensed object is flagged.

Pulsing the light from the emitter has two effects: First, higher instantaneous beam intensities may be produced without high current consumption, and second, signal-to-noise ratios are increased by sampling only at the modulation frequency. Line noise and bulb flicker are well below this frequency, and are attenuated.

Stray light entering the collector from a multitude of sources could cause false triggering of the detector. In addition, if it is sufficiently intense, the collector signal could exceed the dynamic range of the circuitry, and allow products to fall without detection. Further, if the high intensity source is modulated, the collector output will have a strong component mirroring the carrier frequency, which could interfere with accurate detection.

False signs could also be generated whenever the excitation beam's intensity, as perceived by the collector, changes due to reasons other than an occluding object or stray light. A primary contributor to this effect could be mechanical vibration of the system, which could cause the transducer to shift its position relative to the point at which the excitation beam is focused. A rough inverse relationship exists between this "microphonic noise" and stray light rejection: The tighter the focus, hence greater the rejection of stray light, the less deflection from focus is required for the transducer to produce a false signal. However, such low frequency microphonic noise can be filtered out in the pulsed mode embodiment by selecting a pulse frequency that is greater than the frequencies of the microphonic noise, dynamically adjusting the detection threshold and/or adjusting the detection criterion (i.e., selecting the number n).

The above-outlined criteria and considerations are addressed through the design of each of the collector, the emitter and the detector.

The collector's field of view must be sufficiently wide to sense all falling objects. Preferably, substantially all light in the plane of light is collected and concentrated onto a focus by the collector. The field of view of the collector is preferably limited to only the region of the plane of light so as not to allow significant amounts of external light to be collected along with the plane of light.

In a first preferred embodiment, this is achieved by constructing the collector so as to have an electromagnetic radiation detecting element placed at the focus of a reflector. A photodiode is used as the electromagnetic radiation detecting element in the preferred embodiment. The reflector is a sector of a ring section of a parabolic reflector. The center of the section is a point orthogonal to the parabolic axis and at the same coordinate along that axis as the focus. This arrangement produces a, flat, slightly humped field of view which is orthogonal to the parabolic axis. Two such collectors and detectors are used, side by side, to accommodate the space restrictions of the vending machine. There is a dust barrier sealing the space encompassed by the mirrors and transducers.

By design, the parabolic mirrors of the collector reject light rays not parallel to the mirrors' axis. However, neither the mirror coating nor the smoothness and shape of the surfaces of the reflectors are prefect, so they will disperse a certain amount of stray light. Similar problems arise when stray light is diffused, reflected or refracted into a path parallel to the excitation beam by other surfaces besides the mirrors. To absorb most reflected stray light, all surfaces except the mirrors of the collector's optical cavity are painted flat black or made of matte dark plastic material. Errors from light reflected by the mirrors are dealt with by the detector circuit.

Further, selectivity of the excitation beam is accomplished by using infrared emitters and receivers which are spectrally matched. UV and visible light as well as most IR wavelengths are thus significantly attenuated.

The mechanical connection between each mirror and each electromagnetic radiation detection element is very rigid, as it must be, since owing to the parabolic shape of each mirror, even a tiny deflection can result in a large change in output.

The emitter must feed an excitation beam to the collector that is at once bright, parallel to the collector's parabolic axis, and of reasonably uniform intensity across its entire field. But then, it must not be so directional that small deflections in its attitude with respect to the collector result in great radiant intensity shifts on the surfaces of the transducers. A modified parabolic reflector, e.g., one substantially matching the corresponding collector mirror, producing a beam with a certain amount of sphericity could be used, but it is more economical to use a linear array of LED emitters spaced behind a finepitched lenticular array of concave meniscus lenses. Other sources of light may also be used, such as laser diodes, gas discharge lamps, or incandescent radiation sources. The LEDs have built-in parabolic reflectors which give the beam direction, and the lenticular array refracts the beam components and confers a slight sphericity to the radiant field, enough so spatial deflections of the emitter-collector pair do not result in large signal swings.

The LEDs are driven at high currents, at a low duty cycle, and at a selected frequency, none of whose exact values are especially significant to the design. There is a lower bound to the modulation frequency dictated by the minimum size and maximum speed of the detectable objects, but generally, the higher the frequency, the better; the limiting factor being component cost. In the presently preferred implementation, the pulse current is 1 amp at 2% duty cycle, at 2 KHz.

The heart of the detector circuitry is a non-linear element (or a linear element whose gain is such that its transfer function approximates non-linearity), whose threshold is programmable, and is triggered by the output of the collector transducers. The majority of the circuitry employed in the detector is required to track the system parameters, and set the trigger threshold.

Figure 9:
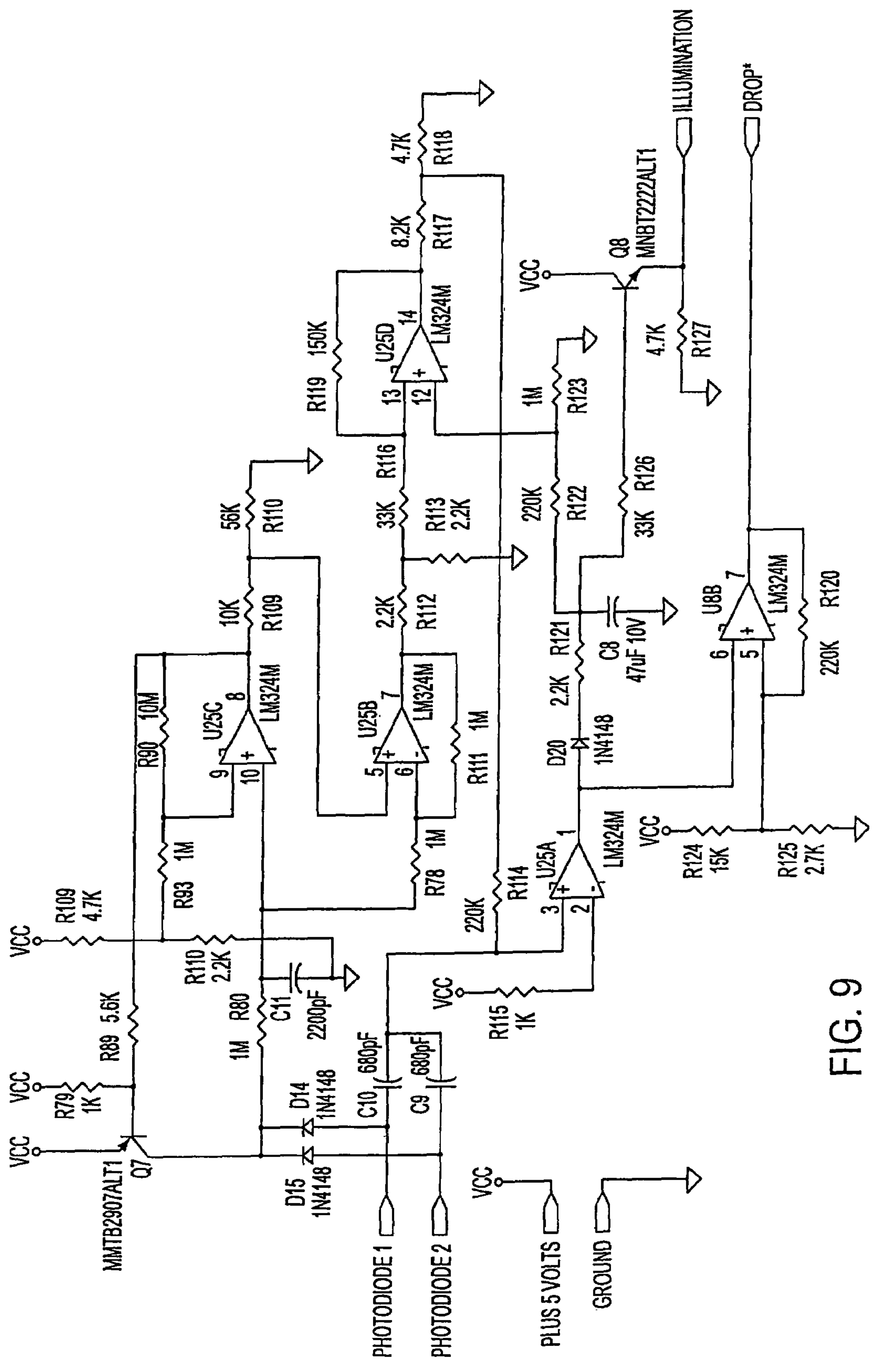
FIG. 9 is a schematic electrical circuit diagram of a formerly preferred embodiment of the optical vend sensor system of the present invention.

The immediately following circuit description refers to the formerly preferred embodiment that is illustrated in FIG. 9.

The cathodes of the photodiodes contained in collector body are attached to the photodiode inputs, and their anodes are grounded. A transduced light pulse appears across the photodiodes as a sharp falling edge, with a logarithmic decay back up to the bias set point. This is due to the action of the automatic bias circuit described next.

Q7, D14, D15, U25C and its associated feedback components form a closed-loop bias network and filter. R80 and C11 are a low pass filter which does not allow the sharp photodiode signal edges to pass through to U25.

However the cutoff frequency is high enough to pass slower signals (such as incandescent flicker). Signals that make it to the non-inverting input of U25 are amplified, and modulate Q7 which controls the reverse current through the photodiodes. The steady state is reached when the integrated output of the photodiodes is approximately equal to the bias voltage set by divider R109-R110. This feedback mechanism regulates the bias point of the photodiodes by tracking changes in the light intensity which are slower than the modulation frequency. Since sharp transitions never make it to the base of Q7, it does not swamp the actual pulses by correcting for their excursions, so the charge on the photodiodes resulting from a sharp light pulse must slowly bleed-off through R80. This produces the decaying edges whose sum is AC-coupled through C9 and C10 to the input of the nearly non-linear switch, in this case, U25A.

Several types of op amps including the LM324 will turn on an internal parasitic transistor and switch their output high if either of their inputs drops below the negative supply by a certain threshold. This is a non-destructive condition in the LM324, provided that input current is limited. So now, a positive going pulse appears at the output of U25A, which persists for as long as the negative going signal spikes are below U25A's threshold. There remains only the matter of setting the threshold to the precise point where a drop in the signal intensity due to a deviation from the steady state (as caused by an occluding object, for example), will momentarily keep the negative signal spike from falling below the threshold and triggering the switch U25A. This is accomplished by feedback loops formed by U25A, B, C, and D.

(There is nothing limiting the design to the chosen configuration of U25A. It may well have been configured as a comparator with feed-forward compensation, or may have been dispensed with altogether and replaced by another type of switch. If, for example, the switch in place was truly non-linear, capable of only two equilibrium states, all that would be required would be to bridge D20, and the circuit would still operate the same way. The only salient points of this part of the design are that the switch act fast and be a feedback element in its threshold biasing loop.)

Let us assume that no input pulses are below the threshold. Divider R117-R118 and R115 insure that the output of U25A will go to ground. If there were charge on C8, it eventually bleeds-off. Also assume that the negative input of U25D is somewhere around Vcc/2, which allows linear operation.

The output of U25D must then fall to ground, pulling R114 down with it. As a result, the DC bias on the right side of the AC coupling capacitors C9 and C10 must go to zero, so any pulses being transmitted through them, provided that they have some minimum amplitude, transcend the threshold of U25A and cause it to trip. These pulses accumulate into a DC voltage at the peak detector formed by R121, C8, and the divider R122-R123, which is fed back through U25D, raising its output and biasing the coupling capacitors C9 and C10 away from the threshold voltage.

Eventually a steady state is reached, in which the capacitors are biased just enough so that U25A generates pulses of just the right height for the peak detector to keep the system equilibrated. If input pulses all of a sudden start to diminish in magnitude by a certain quantum, they will fall below the threshold and not appear at the output of U25A.

(Should U25A have been a non-linear switch, and the peak detector replaced by an integrator, it would be the duty cycle of positive going switch output pulses that would take the place of pulse amplitude as the significant parameter of the system.)

The magnitude of this quantum, being the difference between the amplitude of a pulse below threshold, and one not, is what sets the selectivity (the minimum signal deviation which is detectable) of the system. This is why the switch must behave nearly non-linearly. If it did not, the quantum would be large, with a greater analog range within it. The system would become a simple integrator with no clear distinction between pulses which are present, and those which are not. The selectivity parameter is controlled by the R117-R118 divider.

The time constant set by C8 and its discharge paths is long enough so that its accumulated charge appears as a constant bias voltage to the biasing amp U25D. Nevertheless, it begins discharging immediately after each pulse peak is applied through R121. A large object occluding the excitation beam will cause the input pulses to the switch to retreat very far from the threshold. It will take a relatively long time for C8 to discharge sufficiently to bias C9 and C10 below threshold and resume output pulse production; thus, large objects are easily distinguished even if they take many seconds to traverse the beam.

Small objects do not produce much of a retreat, so U25A will always be close to criticality while the objects are passing through the beam. Consequently, it does not take much of a bias correction on C8 to breach the threshold. Small objects must insure that they can make the pulses recede from threshold faster than C8 can re-bias them toward threshold. This places a limit on the slowest allowable transit time for very small objects. The system can be adjusted toward greater sensitivity by reducing R117, but the cost would be greater susceptibility to microphonic noise.

Since U25A is not truly non-linear (indeed, some linearity is required for the peak detector to be stable) there exists a narrow linear range in which subnormal peaks can be produced at its output. These are treated as microphonic noise and are rejected by the comparator U8B which also squares up and inverts the output pulses, making them ideal microcomputer interrupt generators.

It was assumed earlier on in this description that the inverting input to U25D is near Vcc/2. Actually, the absolute number is not important so long as it biases U25D in the linear region.

This output tracks the level of total illumination of the photodiodes. As illumination rises, the output of U25C falls, as does U25B's, causing U25D to raise its output and allow R114 to bias C9 and C10 back out of clipping.

Q8 is a follower which unloads the output of U25A. It tracks the total energy reaching the surface of the photodiodes and is used by the microprocessor to compare this value to the value stored in memory upon initialization. If that number is lowered by a certain percentage, either the collectors are damaged or there is too much dust built up in the system. The program will then signal an error condition and take the machine off line.

If there is much more light than expected, it means someone is intentionally attempting to flood the system and the program will cancel the vend.

The differences of a presently preferred embodiment of the detector circuitry from the formerly preferred embodiment that has been described above with reference to FIG. 9, is described below with reference to FIG. 10.

Figure 10:
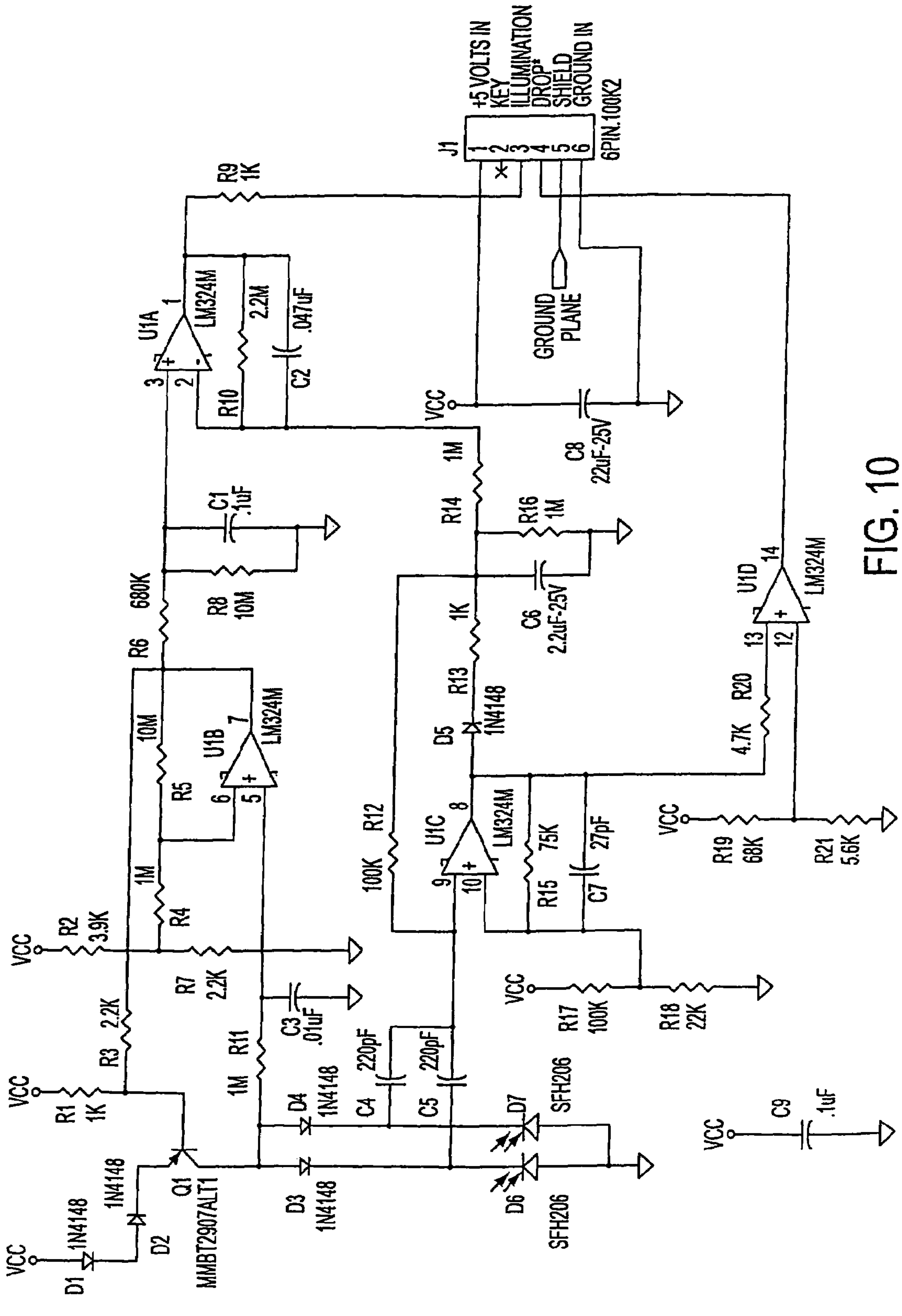
FIG. 10 is a schematic electrical circuit diagram of a presently preferred embodiment.

The embodiment illustrated in FIG. 10 is presently preferred relative to the embodiment illustrated in FIG. 9, because of lower parts count, greater insensitivity to component variation, increased stability of operation, more rapid settling to a quiescent state, and acceptance of a carrier frequency from 2 kHz to 15 kHz.

In comparison with the circuit of FIG. 9, in the circuit of FIG. 10, the automatic bias circuit (U1B) remains basically the same. D1 and D2 have been added to bias the feedback loop containing Q1 into the linear mode for a greater range of illumination. R2 was reduced for the same reason.

C3 was increased to dampen the overshoot from the coupling capacitors C4 and C5. If this was not done, the overshoot would be incorporated into the average illumination signal by U1B and give an erroneous reading.

The main difference is in the trigger circuit U1C (U25A) in the original circuit. Whereas in FIG. 9 the trigger function relied on a side effect of the LM324 for operation, the trigger of FIG. 10 is a conventional comparator with positive feedback.

The static threshold for triggering is set by divider R17-R18. The negative-going spikes fed by C4 and C5 appear inverted and greatly amplified at the output of U1C if their tips fall below the threshold. The peak detector's (D5-C6) output is fed back to clamp C4 and C5 to insure that output pulses continue to appear. A momentary depletion of photodetector signal will cause pulses to be missed while the peak detector adjusts the clamping level, providing the detection signal.

Since the trigger input (Pin 9, U1C) no longer has to be driven below the negative supply, circuit voltage levels are now such that the biasing amp U25D of FIG. 9 is providing biasing directly from the peak detector through R12. Additionally, the input impedance seen on Pin 9 is now higher, and smaller coupling capacitors C4 and C5 are needed.

The trigger's non-linearity is provided by positive feedback through R15. C7 boosts the trigger's sensitivity to short, rapidly changing stimuli (small, heavy falling objects). The hysteresis inherent in the positive feedback of this trigger circuit will suppress an output pulse at Pin 8, U1C, even as the peak detector is correcting the momentary imbalance due to the missing pulse.

This small phase shift allows use of a peak detector with a much quicker decay than does the circuit of FIG. 9, hence a much faster quiescent settling time.

As in FIG. 9, the output pulse is inverted by the comparator U1D. The crossover point of the output pulse is explicitly controlled by divider R19-R21, rather than reliance being placed on the vagaries of downstream logic. Since the pulse is switching at the maximum slew rate at the input of U1D, R120 of FIG. 9 is not required in the circuit of FIG. 10.

System fault conditions are indicated by an analog voltage at the illumination pin. In the FIG. 9 version, that output is buffered by Q8 and generated by the peak detector. This signal level indirectly contains the average illumination through the path U25C U25B U25D R114 (bias at) U25A.

In the FIG. 10 version, the illumination signal is again a composite of the output of the peak detector and the degree of photodetector illumination, except that in FIG. 10 these two components are directly summed (they are opposite senses to the identical stimulus) in U1A. The illumination quantity is the integrated error signal generated by the photodetector biasing amp U1B, isolated by R6 and accumulated on C1. R8 provides a dc path to discharge C1.

The peak detector's contribution is summed through R14 and, when static, indicates to the controller that the system is equilibrated and ready to begin detection.

R9 shields U1A from the effects of the shielded cable's capacitance.

If this compound signal does not reach a static value that is within a preset range, in a certain allowed time, a vend will not commence.

U1C being a sensitive trigger, must necessarily operate at the edge of instability; thus this detector circuit (as is the case with the FIG. 9 version) must be mounted close to the photodiodes for proper operation. If the cable capacitance between the photodiodes and the circuit is too large, poles will be created for both U1B and U1C which are well within the modulation frequency. Compensation on U1B would degrade the system's noise rejection, and compensation on U1C could force the trigger out of non-linearity, defeating its function. Therefore the least costly solution is one which minimizes photodiode capacitance.

Figure 11:
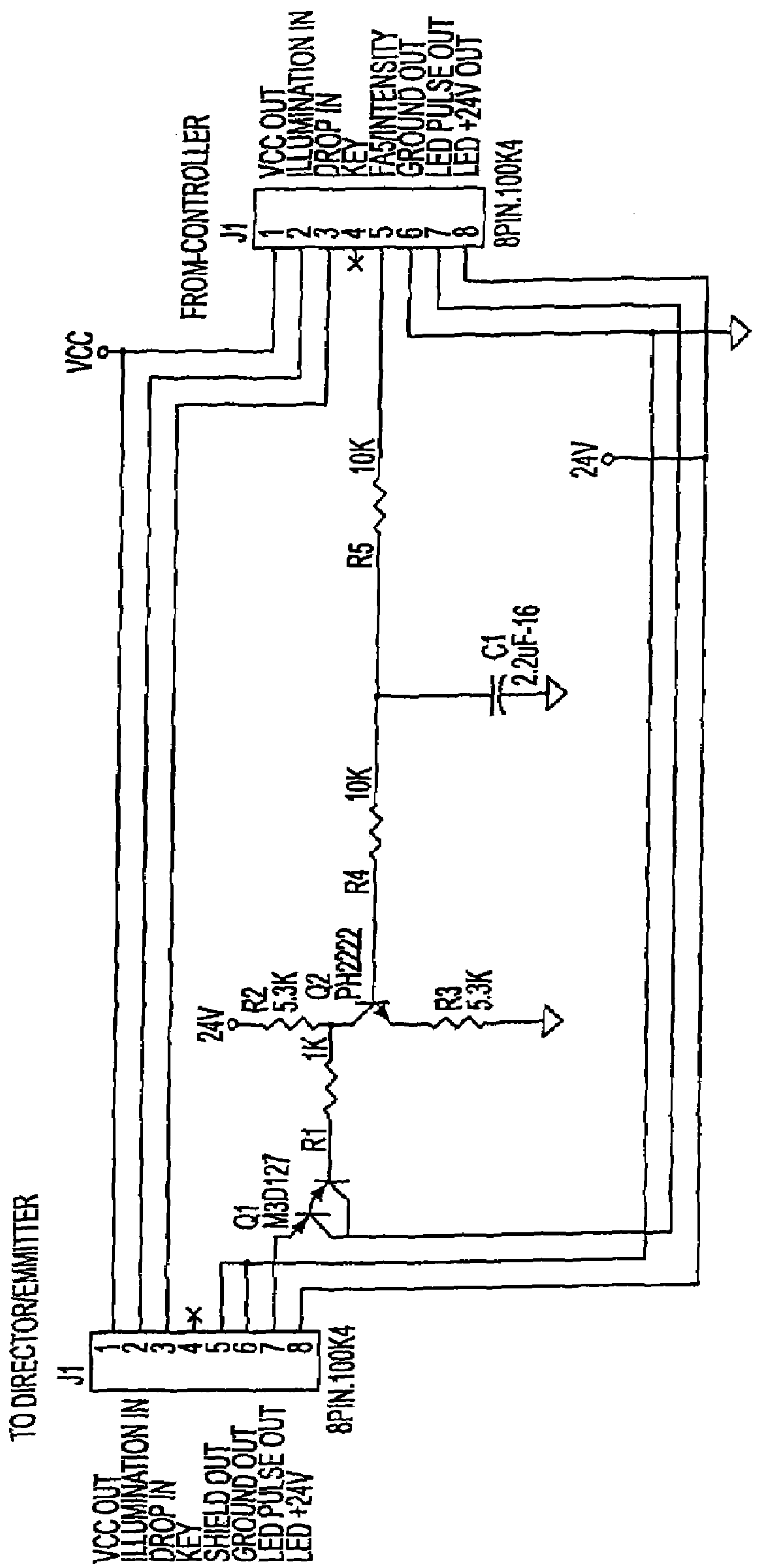
FIG. 11 is a schematic electrical circuit diagram of a circuit that provides automatic and dynamic adjustment of the strength of the light pulses from the emitters.

In the course of testing the invention using the preferred detection circuit, the inventors discovered that all of the component variations (mechanical, optical, and electrical) conspired to reduce the perceived output of the emitters and caused the detector circuit to attempt to operate outside its design parameters. This led to disadvantages that uniformity of operation was not assured from system to system, and assembly line manufacturability was difficult, or possibly precluded. A solution to such problems was found by providing automatic and dynamic adjustment of the strength of the light pulses from the emitters to compensate for these system variables to provide system uniformity. The circuit illustrated in FIG. 11 accomplishes these goals in an economical manner. The circuit illustrated in FIG. 11 comprises a pulse-width-modulated (PWM), adjustable current source in series with the chopper transistor. Feedback for the PWM is provided by the extant illumination.

Figure 12:
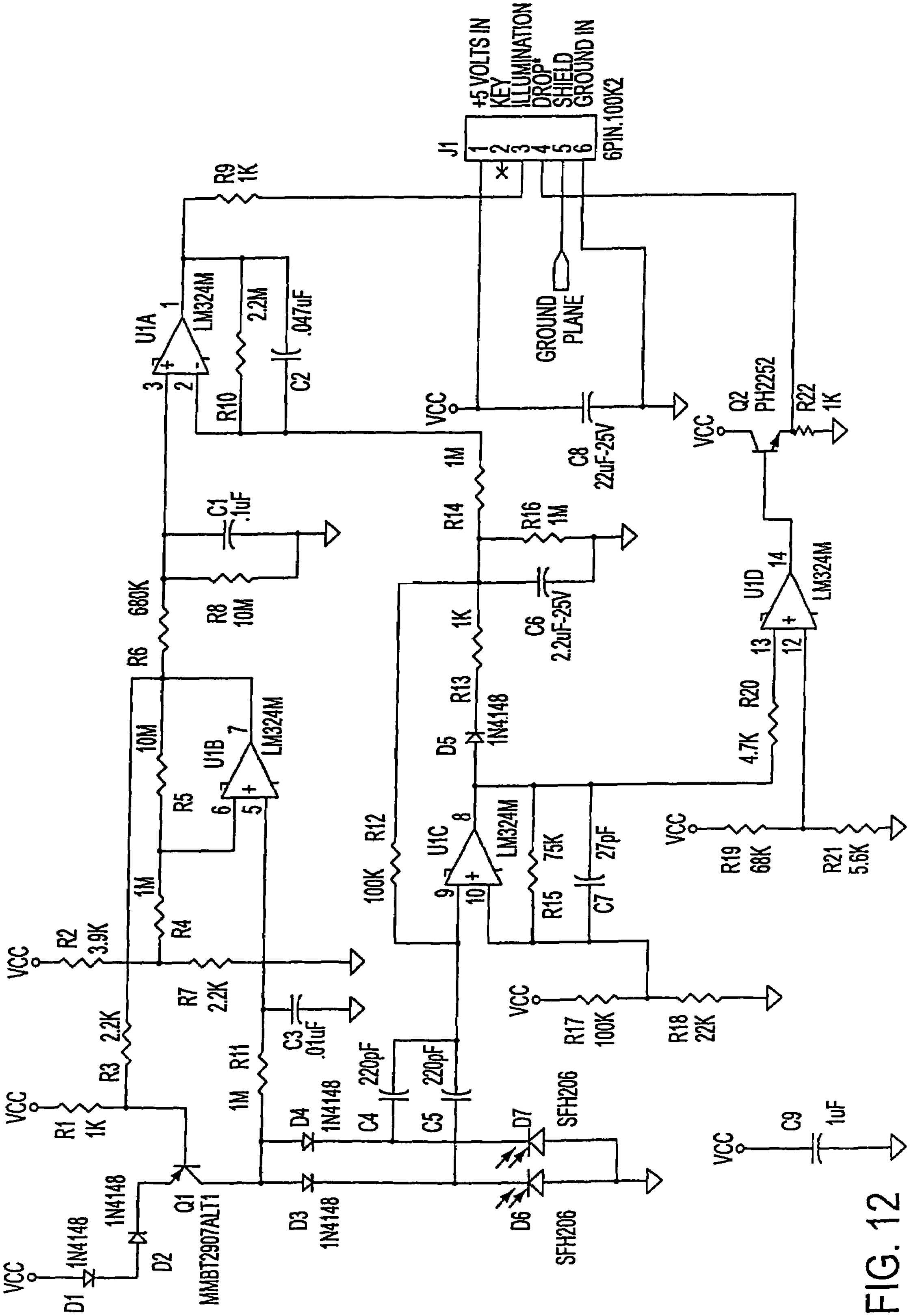
FIG. 12 is a schematic electrical circuit diagram corresponding to FIG. 10 which includes buffering the output through the emitter follower.

The inventors also discovered, during tests of the invention, that the output buffer U1D was sensitive to capacitive loading of its output when its output line was run through shielded cable, and distorted the "Drop" signal. The circuit provided in the diagram of FIG. 12 is the same as that of FIG. 10, except that the output through the emitter follower is buffered. This is only one of many possible fixes to the capacitive loading problem, and does not limit the general concepts of the invention.

In the preferred implementation of a vendor equipped with the preferred embodiment of the vend sensor of the present invention, after a spiral or pair of spirals begin to turn following selection of a product to be vended, the spiral or spirals are not caused to stop simply due to their having rotated through an angular distance calculated to be sufficient to have caused the corresponding column of products to have been conveyed sufficiently far forwards that the leading one and only the leading one has lost support from beneath and, as a result, has fallen from the respective shelf and into the vend space. Rather, the spiral or spirals turn until either it has been sensed by the vend-sensing system that a product has been vended, or (in the preferred implementation) that the spiral has, or spirals have, turned through 540° and then pulsed three times (whereupon, if no product is sensed to have been dispersed), the customer is given by the selector panel a choice to have their form of payment refunded, or to select another column's product. Thus, the vending machine will vend properly even if one inter-turn pocket of a spiral or pair of spirals has mistakenly been left empty when the machine was restocked, or if a product is misoriented towards earlier, or later reaching the point where it will lose support from the underlying tray surface compared with other products pocketed behind it in the trailing inter-turn pockets of the respective spiral or spirals.

By using a row of closely spaced LEDs behind a lenticular diffuser in the first or second embodiments, the beam intensity is caused to be substantially constant in the front-to-rear depthwise direction of the vend space. The arrangement of emitter and dimple reflector in the third embodiment provides a substantially uniform plane of illumination light. The plane of the light beam must be located below the lowest tray location, but above the envelope of movement of any of the structure of the vend hopper door (e.g. the fold-up inner door).

In a preferred embodiment of the invention the optical vend-sensing system performs calibration operations. More preferably, the vend-sensing system has a plurality of calibration operations, each of which is performed depending upon the operating conditions of the vending machine.

Figure 13:
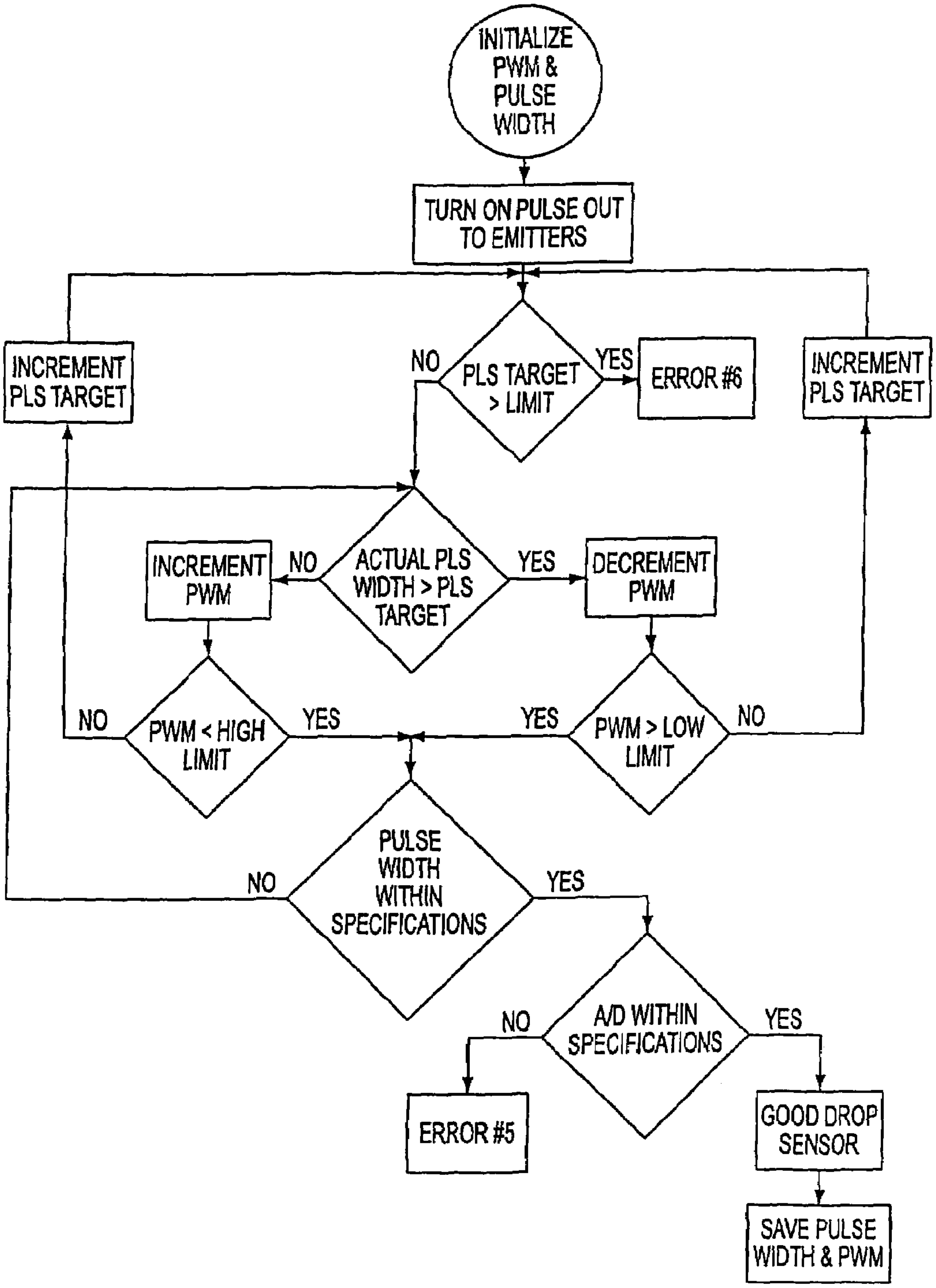
FIG. 13 is a flowchart illustrating the service mode calibration of the vend-sensing system.
Figure 14:
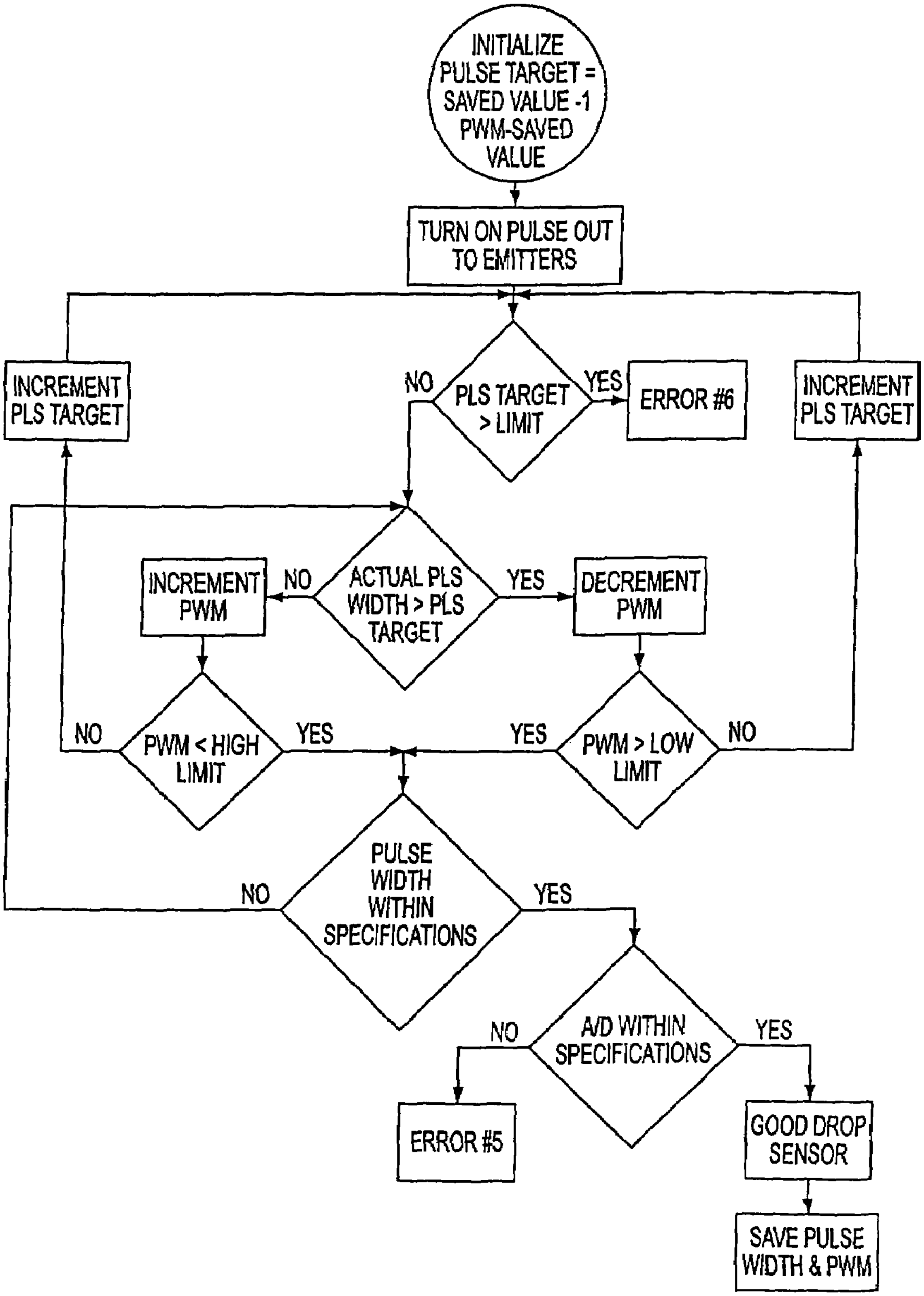
FIG. 14 is a flowchart illustrating the sales mode calibration of the vend-sensing system.
Figure 15:
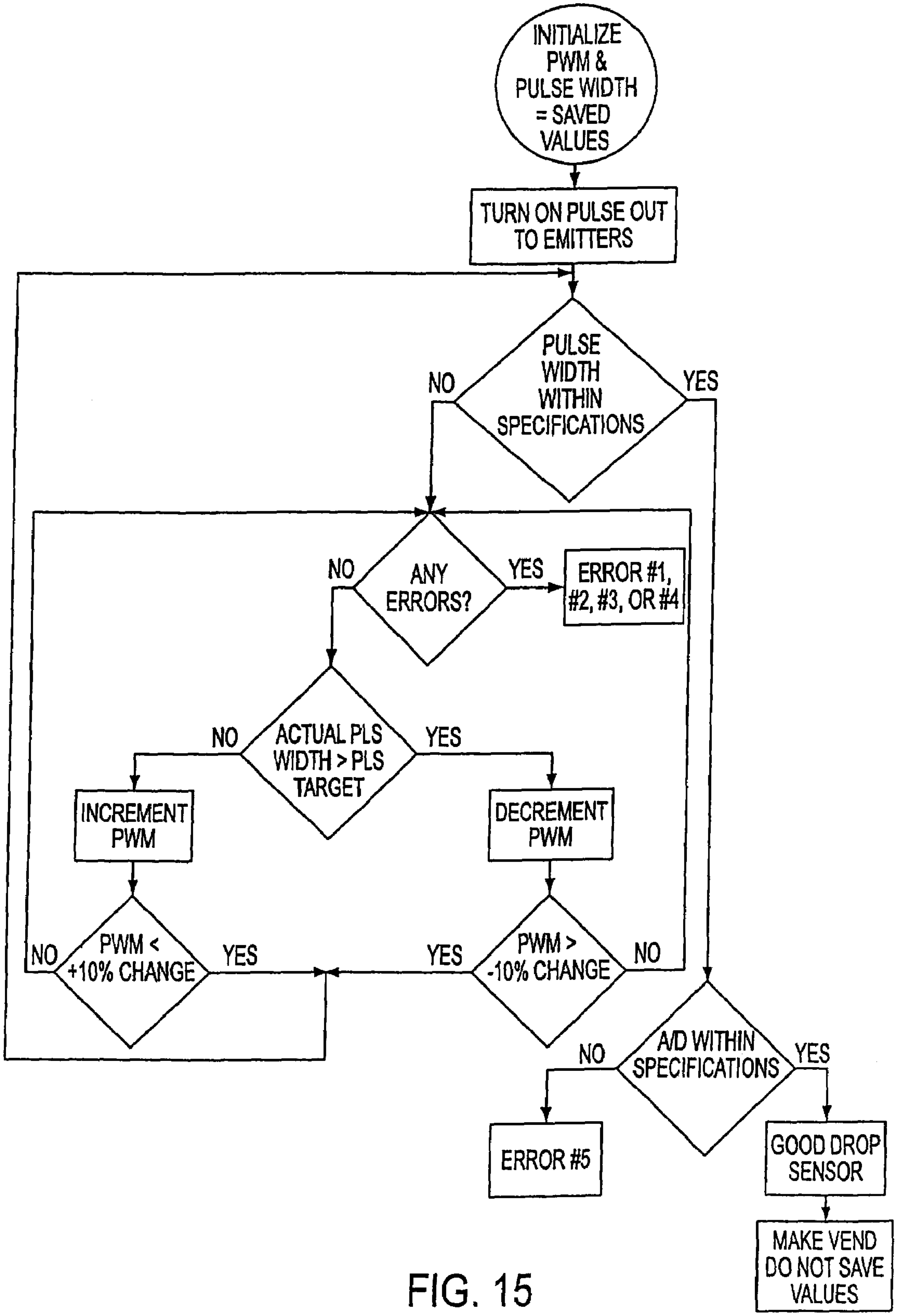
FIG. 15 is a flowchart illustrating the pre-vend calibration of the end-sensing system.
Figure 16:
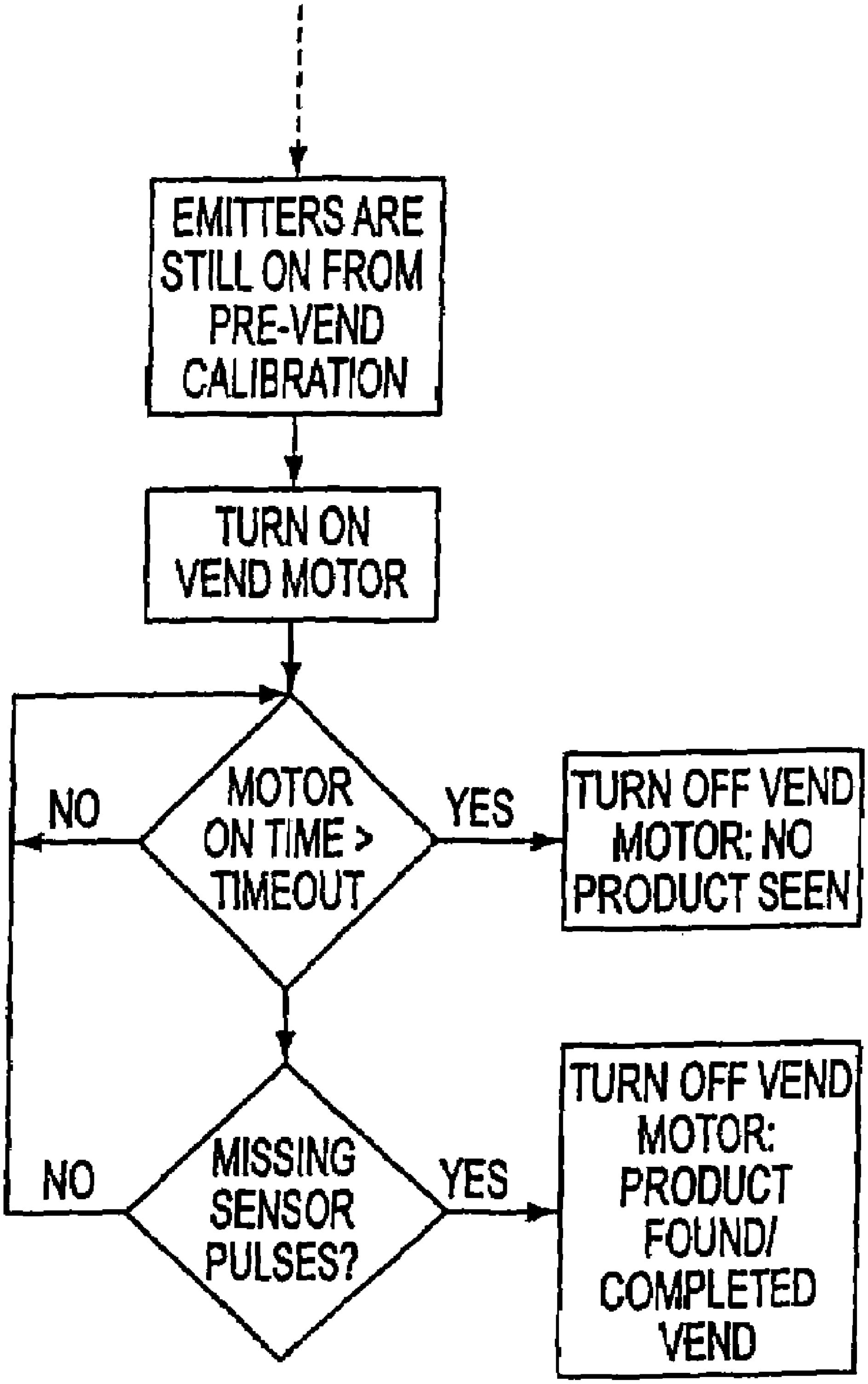
FIG. 16 is a flowchart illustrating the vend operation logic of the vend-sensing system.

FIGS. 13, 14, 15 and 16 are flowcharts illustrating calibration and operation logic of an implementation of an embodiment of the invention. The service mode calibration illustrated in FIG. 13 is conducted only when it is specifically selected. The sales mode calibration illustrated in FIG. 14 is conducted every minute while the door of the vending machine is open, and every minute for 10 minutes after the vending machine door closes. The sales mode calibration is then conducted at 3 minute intervals at other times during normal operation. The pre-vend calibration is conducted immediately before a vend and is only used to check to see if the drop sensor is working properly. No calibration values are changed during the pre-vend calibration. FIG. 16 illustrates the vend operation.

In a particular embodiment, the pulse width ("PULSE") is twice the measured detected signal pulse and ranges from about 16 μsec. to about 50 μsec. The ("BASIS") for light intensity, is a compound signal which combines ambient and excitation light. The ambient light is external to the system and excitation light is from the system. In a particular implementation of the preferred embodiment of the invention, the basis ranges from 0 through 200. The software will flag an error if the value is less than 10 or more than 180. A higher number denotes a lower light intensity. The pulse width modulation (PWM) of the LED drive signal ranges from 300 to 800 in the implementation of the preferred embodiment of the invention. A higher number of PWM denotes a lower intensity. The PWM is the intensity of the LED drive signal required to generate a received pulse that is in PULSE units wide.

The following describes the currently preferred calibrations:

Full Calibration

A Full Calibration always starts calibrating at the predefined PULSE. width lower limit, which currently preferred to be eight (8). Calibration in this mode will complete only when the following conditions are met:

About one-hundred and sixty (160) consecutive pulses are received from the detector system with a PULSE width variance of less than about 1 micro-second.

PULSE must be less than about fifty (50).

BASIS must be between ten (10) and one-hundred and eighty (180).

PWM must be between three-hundred (300) and eight-hundred (800).

A Full Calibration will reset all saved system variables and then re-calibrate the system to meet the requirements as defined above. The PULSE is initialized at its lowest point and then incremented by a preselected amount (which will be referred to as a "quantum") to find a stable value to ensure that the optimum PULSE width is achieved for current external variables. External variables including temperature, ambient light, and dew (on mirrors). Note that the calibration requirement for the PULSE width variance is extremely stringent. This is done to ensure that the system is stable. If this variance requirement is met then the system is ready and capable to perform vends.

Limit-less Calibration

A Limit-less Calibration will start calibrating at a predefined value given to PULSE minus one (1) PULSE quantum. This value is defined as the last calibration that performed within specifications defined in the given calibration type. The value of PULSE is subtracted by one (1) to allow the system to initialize at a more sensitive level under normal operating conditions. Calibration in this mode will complete when the following conditions are met:

About one-hundred and sixty (160) consecutive pulses are received from the detector system with a PULSE width variance of less than about two (2) micro-second.

PULSE must be less than about fifty (50).

BASIS must be between ten (10) and one-hundred and eighty (180).

PWM must be between three-hundred (300) and eight-hundred (800).

A Limit-less Calibration will not reset any of the system variables, but rather start at a predefined point minus one (1). At this point the system will initialize or increment the PULSE width to meet the requirements defined for a Limit-less Calibration. Note that the value of BASIS and PWM can change (as long as they are within a valid range defined above) by as much as is needed with out any limits. No limits are used with this calibration to ensure that the calibration is completed. This type of calibration should be completed when external system variables are changing quickly. The Limit-less Calibration will ensure that the system will still perform.

Limited Calibration

A Limited Calibration will start calibrating at a predefined value given to PULSE minus one (1). This value is defined as the last calibration that performed within specifications defined in the given calibration type. The value of PULSE is subtracted by one (1) to allow the system to initialize at a more sensitive level under normal operating conditions. Calibration in this mode will complete when the following conditions are met:

About one-hundred and sixty (160) consecutive pulses are received from the detector system with a PULSE width variance of less than about two (2) micro-seconds.

PULSE must be less than about fifty (50).

BASIS must be between ten (10) and one-hundred and eighty (180).

PWM must be between three-hundred (300) and eight-hundred (800).

The total changes in the PWM and the BASIS can not be more than about +/−10%. The Limited Calibration is similar to the Limit-less Calibration except that the Limited Calibration will limit the difference between the PWM and the BASIS to about +/−10% from the previous calibration. This is done to prevent any tampering with the system. It is assumed that if this difference changes by more than about +/−10% since the last calibration then something is wrong with the system because under no circumstances should these system variables (PWM and BASIS) change so much so rapidly.

Calibration Check

A Calibration Check's only purpose is to check for the functionality of the drop system directly before a vend. Calibration in this mode will use pre-existing values for PULSE and PWM to test the system. No variables will be changed in a Calibration Check. For a vend to be initiated the following conditions have to be met:

About sixty-four (64) consecutive pulses are received from the detector system with a PULSE width variance of less than about three (3) micro-seconds.

BASIS must be between ten (10) and one-hundred and eighty (180).

The total difference between PWM and the BASIS can not change by more than +/−10%.

Since the calibration constants are not allowed to change, less stringent requirements are imposed on this mode. A Calibration Check is only performed before a vend. It is performed to make sure that the system is still working directly before the vend. If the system is not working, then no product will be vended.

Power-Up

Every time the controller powers up, the controller checks to see if a calibration is due to be performed. If the controller has been off for longer than about five minutes or if the current ambient temperature has changed by about two (2) or more degrees Fahrenheit (in either direction) then a Limit-less Calibration is performed. It is assumed that if either of these two conditions are met then the possibility of tampering is not likely. A Limit-less Calibration is performed to make sure that the system is functional.

If the time since last calibration (including power-down time) is between about three (3) and about five (5) minutes then a Limited Calibration is performed. The chance of tampering is quite possible for this situation and therefore the difference between PWM and BASIS is limited to a +/−10% change. A calibration is performed immediately to simulate normal operating conditions, where a Limited Calibration occurs about every three (3) minutes.

If the last power-down occurred within about three (3) minutes, then no calibration occurs. Chances of tampering here are high, so it is important to perform a calibration with limits (see Limited Calibration) only at the scheduled time.

Service Mode (Option 5)

If Option 5 is selected in Service Mode then a Full Calibration is performed. Since a calibration in Service Mode is deliberate, then this calibration will reset all detector system variables and then initialize.

Sales Mode with Door Open or Sales Mode with Door Closed Less than Ten Minutes

For these two conditions a Limit-less Calibration occurs every minute. Variables like temperature and dew on the detector mirrors are likely to change quickly under these circumstances. Calibrating often will allow the detector system to function properly. When this calibration occurs, if the new value for BASIS is less than the previous value then a new Limit-less Calibration will be performed directly after the first calibration (not waiting the one (1) minute). This will continue to happen until the saved PULSE width is not less than the previous one or until the PULSE gets to the lower limit of eight (8). This is done to ensure that the most sensitive system state has been reached.

Sales Mode with Door Closed More than Ten Minutes

If the door has been closed for more than ten (10) minutes, then a Limited Calibration occurs about every three (3) minutes.

Pre-Vend

Prior to vending, a Calibration Check is performed to insure that the drop sensor system is functioning properly before vending.

Table I provides a list and description of the sensor error codes specified in FIGS. 13-16.

TABLE I

| ERROR NUMBER | ERROR TYPE | POSSIBLE REASONS |
|---|---|---|
| 1 | Insufficient Light | Disconnected Sensor, Blocked Optics, Defective Emitter, or Blocked Optical Path |
| 2 | Too Much Light | Shorted Wiring, Defective Logic Board, Defective Emitter, Missing Diffuser |
| 3 | No Signal | Disconnected Sensor, Disconnected, Defective, or Misaligned Emitter, Defective Logic Board |
| 4 | Signal Has Poor Quality | Defective Sensor, Partially Blocked Optical Path, EM Interference at Sensor |
| 5 | Drastic Environmental Shift | Improper Calibration, Too Much and Too Sudden of a Change in Temperature or Ambient Light, Sudden Degradation in Efficiency of Detector or Emitter Board |
| 6 | Fatal Detector Failure | Defective or Blocked Detector (This May Also Occur if Extreme Condensation is on the Detector Mirrors), Disconnected Connector Cable |

In addition to indicating a calibration error type, the day and time are stored in memory along with the error type in the preferred embodiment.

It should now be apparent that the optical vend-sensing system for control of the vending machine as described hereinabove, possesses each of the attributes set forth in the specification under the heading "Summary of the Invention" hereinbefore. Because it can be modified to some extent without departing from the principles thereof as they have been outlined and explained in this specification, the present invention should be understood as encompassing all such modifications as are within the spirit and scope of the following claims.

We claim:

1. A vending machine, comprising:

a front panel;

one or more product trays wherein at least one product tray includes a product dispensing mechanism configured to perform a vending operation by which a selected product stored on one of said one or more product trays is advanced over a front edge of said one or more product trays so as to initiate delivery of a product upon selection by a customer;

a product delivery path comprising a portion of space in said vending machine into which said selected product falls after being advanced beyond said front edge of said one or more product trays and through which said selected product freely falls, independent of a product lowering mechanism, into a customer accessible bin for retrieval by the consumer, said product delivery path having a front-to-rear depth which extends substantially between said vending machine front panel and said front edge of said one or more product trays on which products are stored;

an optical vend-sensing system placed within said vending machine below said one or more product trays but above a customer accessible area of said bin, said optical vend-sensing system being configured to sense when said selected product freely falls through said product delivery path;

said optical vend-sensing system comprises:

one or more emitters placed on a first side wall of said product delivery path and configured to emit electromagnetic radiation into a cross-section of said product delivery path, at least two active electromagnetic radiation detectors placed on a second side wall of said product delivery path opposite the first side wall upon which said one or more emitters are placed, said at least two active electromagnetic radiation detectors being positioned across said product delivery path at a distance from said one or more emitters that is greater than said front-to-rear depth and configured to receive electromagnetic radiation emitted by each of said one or more emitters, said one or more emitters and said at least two detectors being positioned so as to create a detection zone that substantially extends across the front-to-rear depth of said product delivery path, vend detection circuitry operatively connected to said at least two active electromagnetic radiation detectors and being configured to detect changes in said electromagnetic radiation caused by said selected product as it freely falls through said product delivery path and to generate a positive vend detection signal in response thereto; and vending machine control circuitry operatively connected with said product dispensing mechanism of said one or more product trays and said vend detection circuitry, said vending machine control circuitry configured to cause said product tray dispensing mechanism associated with said selected product to activate vending operation upon an attempted customer purchase and to continue said vending operation until the positive vend detection signal is received from said vend detection circuitry or a predetermined secondary condition occurs in which no positive vend detection signal is received during a timeout period;

wherein said vending machine control circuitry implements a corrective action when positive vend detection signal from said vend detection circuitry has not been received and said predetermined secondary condition has occurred, said corrective action comprises maintaining a credit established by the customer to allow an alternative selection or to provide a refund.

2. The vending machine of claim 1, wherein said vend detection circuitry detects changes in said electromagnetic radiation caused by said selected product passing through said product delivery path by determining that said electromagnetic radiation received by said at least two active detectors has been temporarily reduced by a threshold amount.

3. The vending machine of claim 2, wherein said one or more emitters are concurrently operative.

4. The vending machine of claim 3, wherein said front panel is a transparent front.

5. The vending machine of claim 4, wherein the electromagnetic radiation emitted by said one or more emitters is modulated at a frequency selected to reduce interference from ambient light.

6. The vending machine of claim 5, wherein the electromagnetic radiation is modulated at a frequency higher than 120 Hz.

7. The vending machine of claim 4, wherein said vend detection circuitry includes an ambient light calibration circuit that accounts for current ambient light conditions in establishing said threshold amount.

8. The vending machine of claim 4, wherein said one or more emitters is a row of electromagnetic emitters, said row substantially extending the front-to-rear depth of said product delivery path.

9. The vending machine of claim 8, wherein said one or more emitters forming said row are positioned so as to permit detection of a narrowest selected product that falls through the delivery path.

10. The vending machine of claim 9, wherein said narrowest selected product is about 0-0.25 inches in width.

11. The vending machine of claim 8, wherein said front to back depth of said product delivery path is about 9 inches.

12. The vending machine of claim 11, wherein said row of emitters is about 9 inches long.

13. A vending machine, comprising:

a front panel;

one or more product trays wherein at least one product tray includes a product dispensing mechanism configured to perform a vending operation by which a selected product stored on one of said one or more product trays is advanced over a front edge of said one or more product trays so as to initiate delivery of a product upon selection by a customer;

a product delivery path comprising a portion of space in said vending machine into which said selected product falls after being advanced beyond said front edge of said one or more product trays and through which said selected product freely falls, independent of a product lowering mechanism, into a customer accessible bin for retrieval by the consumer, said product delivery path having a front-to-rear depth which extends substantially between said vending machine front panel and said front edge of said one or more product trays on which products are stored;

an optical vend-sensing system placed within said vending machine below said one or more product trays but above a customer accessible area of said bin, said optical vend-sensing system being configured to sense when said selected product freely falls through said product delivery path;

said optical vend-sensing system comprising:

at least one emitter of electromagnetic radiation directed into said product delivery path, at least one reflector positioned within said vending machine to reflect the electromagnetic radiation emitted by said at least one emitter, at least one detector of electromagnetic radiation arranged to receive at least a portion of said electromagnetic radiation emitted by the at least one emitter and reflected by said at least one reflector, the at least one emitter of electromagnetic radiation, the at least one reflector, and the at least one detector of electromagnetic radiation being arranged to create a vend detection zone within the product delivery path; and vend detection circuitry operatively connected to said at least one detector and being configured to detect changes in said electromagnetic radiation caused by said selected product as it freely falls through said vend detection zone and to generate a vend detection signal in response thereto.

14. A glass-front vending machine, comprising:

a transparent front panel;

one or more product trays including a product dispensing mechanism configured to perform a vending operation by which a selected product stored on one of said one or more product trays is advanced over a front edge thereof so as to initiate delivery of a product upon selection by a customer;

a product delivery path comprising a portion of space in said vending machine having a front-to-rear depth which extends substantially between said vending machine transparent front panel and said front edge of said one or more product trays and into and through which said selected product freely falls into a customer accessible bin for retrieval by the consumer after being advanced beyond said front edge;

an optical vend-sensing system placed within said vending machine and configured to sense when said selected product freely falls through said product delivery path;

said optical vend-sensing system comprising:

one or more emitters placed on a first side of said product delivery path and configured to emit electromagnetic radiation into said product delivery path, one or more electromagnetic radiation detectors placed on a second side of said product delivery path opposite the side upon which said one or more emitters are placed, said one or more electromagnetic radiation detectors being configured to receive at least a portion of said electromagnetic radiation emitted by each of said one or more emitters, vend detection circuitry operatively connected to said one or more electromagnetic radiation detectors and being configured to: (i) detect changes in said electromagnetic radiation caused by said selected product as it freely falls through said product delivery path; and to (ii) generate a positive vend detection signal in response thereto, an ambient light calibration circuit configured to adjust a detection threshold used by said vend detection circuitry configured to minimize interference from light originating from other than said one or more emitters; and vending machine control circuitry operatively connected to said product dispensing mechanism and said vend detection circuitry, said vending machine control circuitry configured to cause the product tray dispensing mechanism associated with the selected product to activate a vending operation upon an attempted customer purchase and to continue said vending operation until the positive vend detection signal is received from said vend detection circuitry or a predetermined secondary condition occurs in which no positive vend detection signal is received during a timeout period;

wherein said vending machine control circuitry implements a corrective action when positive vend detection signal from said vend detection circuitry has not been received and said predetermined secondary condition has occurred, said corrective action comprises maintaining a credit established by the customer to allow an alternative selection or to provide a refund.

15. The vending machine of claim 14, further comprising a row of electromagnetic emitters extending across the front-to-rear depth of said product delivery path and creating a least one plane of electromagnetic radiation that spans a cross-section of said product delivery path and reaches said one or more electromagnetic radiation detectors.

16. The vending machine of claim 14, wherein said ambient light calibration circuit tests current ambient light conditions existing prior to a sale and resets the detection threshold to account for said current ambient light conditions.

17. The vending machine of claim 16, wherein the detection threshold is increased in response to increased ambient light conditions.

* * * * *

Disclaimer

7,742,837 B2 — James M. Hair, III, Cheyenne, WY (US); Kyriakos P. Spentzos, Santa Rosa, CA (US). OPTICAL VEND-SENSING SYSTEM FOR CONTROL OF VENDING MACHINE. Patent dated June 22, 2010. Disclaimer filed January 15, 2014, by the assignee, Automated Merchandising Systems Inc.

Hereby disclaim the complete claims 1-17 of said patent.

*(Official Gazette, February 18, 2014)*

US007742837C1

(12) INTER PARTES REEXAMINATION CERTIFICATE (846th)

United States Patent

Hair, III et al.

(10) Number: US 7,742,837 C1

(45) Certificate Issued: Mar. 20, 2014

(54) OPTICAL VEND-SENSING SYSTEM FOR CONTROL OF VENDING MACHINE

(75) Inventors: James M. Hair, III, Cheyenne, WY (US); Kyriakos P. Spentzos, Santa Rosa, CA (US)

(73) Assignee: Automated Merchandising Systems, Inc., Kearneysville, WV (US)

Reexamination Request:
No. 95/000,608, Feb. 4, 2011

Reexamination Certificate for:

| | |
|---|---|
| Patent No.: | **7,742,837** |
| Issued: | **Jun. 22, 2010** |
| Appl. No.: | **12/010,126** |
| Filed: | **Jan. 22, 2008** |

Disclaimer of Claims 1-17,
Filed: Jan. 15, 2014 (1399 OG 150)

Related U.S. Application Data

(63) Continuation of application No. 11/639,231, filed on Dec. 15, 2006, now Pat. No. 7,343,220, which is a continuation of application No. 10/838,222, filed on May 5, 2004, now Pat. No. 7,191,915, which is a continuation of application No. 09/729,853, filed on Dec. 6, 2000, now Pat. No. 6,794,634, which is a continuation of application No. 09/261,221, filed on Mar. 3, 9999, now Pat. No. 6,384,402.

(60) Provisional application No. 60/083,522, filed on Apr. 29, 1998.

(51) Int. Cl.
*G06F 17/00* (2006.01)

(52) U.S. Cl.
USPC .................... 700/236; 221/2; 221/7; 221/13

(58) Field of Classification Search
None
See application file for complete search history.

(56) References Cited

To view the complete listing of prior art documents cited during the proceeding for Reexamination Control Number 95/000,608, please refer to the USPTO's public Patent Application Information Retrieval (PAIR) system under the Display References tab.

*Primary Examiner* — Robert M. Fetsuga

(57) ABSTRACT

For ensuring that a vending machine motor will continue to operate until a product has descended through a vending space or an established time interval has elapsed, an optical beam is established across the vend space through which a product must drop. A change in beam intensity is detected. By preference infra red light is emitted at one focal point of an elliptical reflector, and detected at the other focal point. The light is emitted in pulses in the preferred embodiment, and the optical sensing system has automated calibration and error detecting functions.

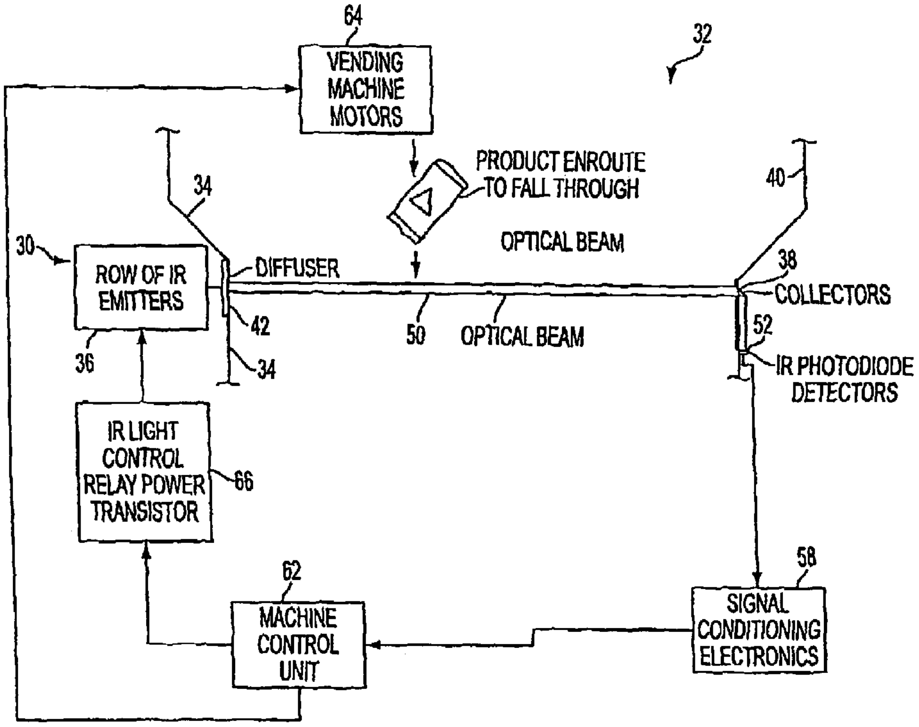

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 1-17 are now disclaimed.

* * * * *